United States Patent
Nakane et al.

(10) Patent No.: US 6,466,530 B1
(45) Date of Patent: Oct. 15, 2002

(54) OPTICAL DISK, OPTICAL DISK DRIVE APPARATUS, AND OPTICAL DISK TRACKING METHOD

(75) Inventors: Kazuhiko Nakane; Hiroyuki Oohata; Masato Nagasawa; Kenji Gotoh; Yoshinobu Ishida, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/956,103

(22) Filed: Sep. 20, 2001

Related U.S. Application Data

(62) Division of application No. 09/556,437, filed on Apr. 24, 2000, which is a division of application No. 09/332,071, filed on Jun. 14, 1999, now Pat. No. 6,201,775, which is a division of application No. 08/829,119, filed on Apr. 10, 1997, now Pat. No. 6,091,699.

(30) Foreign Application Priority Data

Apr. 15, 1996 (JP) .............................................. 8-92885

(51) Int. Cl.[7] .............................................. G11B 7/00
(52) U.S. Cl. ............................. 369/47.17; 369/59.18; 369/124.15
(58) Field of Search ............................. 369/59.1, 59.15, 369/59.17, 59.18, 53.1, 47.1, 47.35, 124.01, 124.05, 124.08, 124.15, 47.17, 53.12, 53.13, 53.15, 53.16, 44.32

(56) References Cited

U.S. PATENT DOCUMENTS

| | | | |
|---|---|---|---|
| 5,206,847 A | * | 4/1993 | Kanda .................. 369/44.25 X |
| 5,361,245 A | | 11/1994 | Yoshida et al. |
| 5,483,514 A | * | 1/1996 | Kanda .................. 369/44.25 X |
| 5,508,995 A | | 4/1996 | Moriya et al. |
| 5,508,996 A | | 4/1996 | Endoh |
| 5,537,373 A | | 7/1996 | Horikiri |
| 5,638,354 A | | 6/1997 | Nakayama et al. |
| 5,754,506 A | | 5/1998 | Nagasawa et al. |
| 5,838,658 A | | 11/1998 | Nakane et al. |
| 5,862,112 A | | 1/1999 | Nagai et al. |
| 5,867,474 A | | 2/1999 | Nagasawa et al. |
| 5,892,740 A | | 4/1999 | Nagasawa et al. |
| 5,933,397 A | | 8/1999 | Yamashita et al. |
| 5,933,410 A | | 8/1999 | Nakane et al. |
| 5,936,932 A | | 8/1999 | Nakane et al. |
| 5,946,285 A | | 8/1999 | Nakane et al. |
| 6,058,099 A | | 5/2000 | Senshi |
| 6,064,643 A | | 5/2000 | Tanoue et al. |
| 6,091,688 A | | 7/2000 | Tanoue et al. |

FOREIGN PATENT DOCUMENTS

| | | |
|---|---|---|
| EP | 628952 | 12/1994 |
| EP | 757343 A1 | 8/1996 |
| EP | 9740291 | 10/1996 |

(List continued on next page.)

Primary Examiner—Muhammad Edun

(57) ABSTRACT

The invention provides an optical disk medium having a recording spiral formed by connecting groove tracks and land tracks alternately, and permitting detection of a connecting point between a groove track and a land track reliably is provided, and a method of tracking the optical disk medium and an optical disk drive apparatus for driving the optical disk medium. One part of an identification signal area is shifted by a predetermined distance in one radial direction from the center of a groove, while another part of the identification signal area is shifted by the same distance in the opposite radial direction from the center of the groove. A land/groove polarity of a sector is determined by the polarity of a tracking error signal and the order of the polarities during reproduction of an identification signal.

4 Claims, 18 Drawing Sheets

FOREIGN PATENT DOCUMENTS

| | | |
|---|---|---|
| GB | 2307589 | 6/1997 |
| JP | 6459632 | 3/1964 |
| JP | 6357859 | 3/1982 |
| JP | 438633 | 2/1992 |
| JP | 696447 | 4/1994 |
| JP | 6176404 | 6/1994 |
| JP | 6274896 | 9/1994 |
| JP | 6290465 | 10/1994 |
| JP | 6325368 | 11/1994 |
| JP | 750014 | 2/1995 |
| JP | 7057302 | 3/1995 |
| JP | 7110944 | 4/1995 |
| JP | 7141701 | 6/1995 |
| JP | 8022621 | 1/1996 |
| JP | 9106579 | 4/1997 |
| JP | 9282669 A | 10/1997 |

* cited by examiner

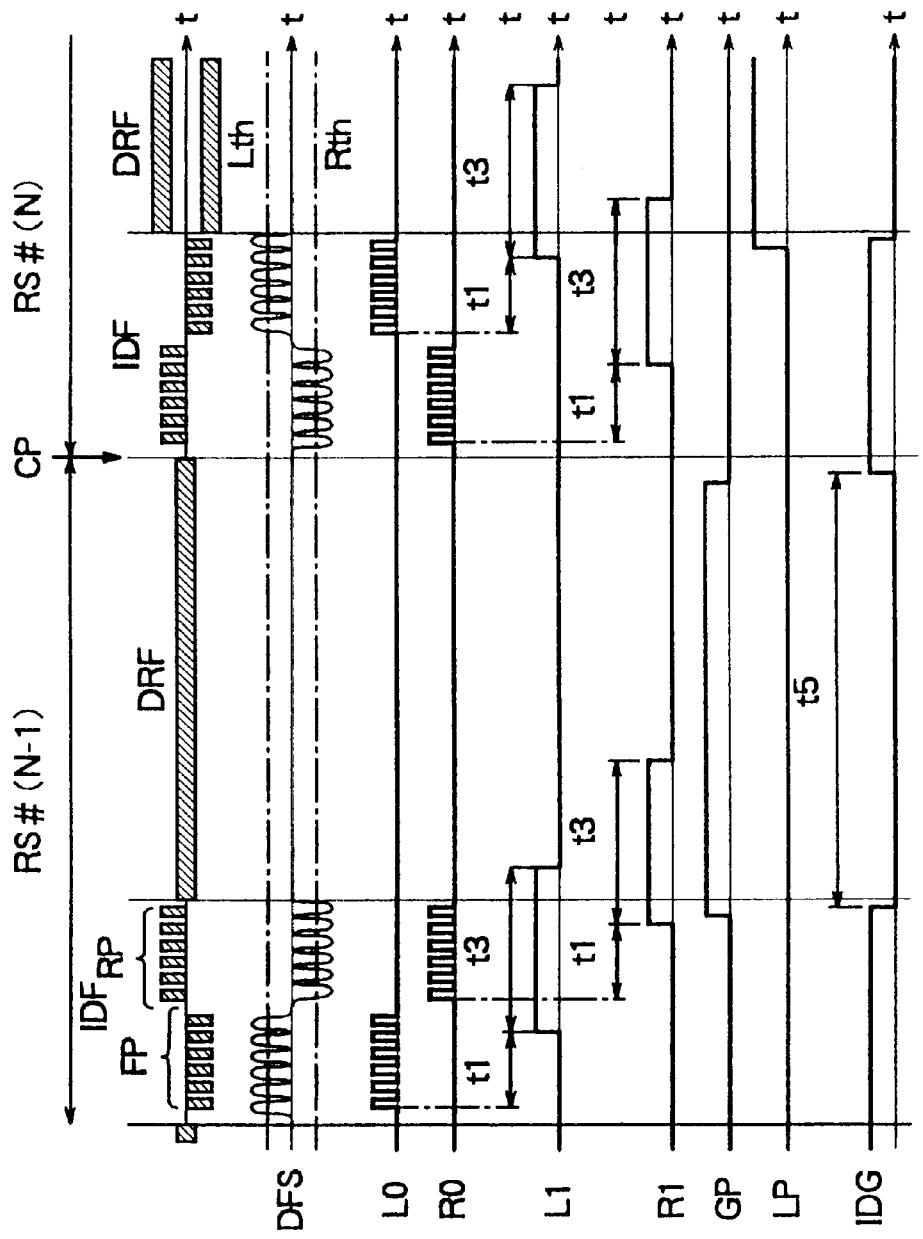

OPTICAL DISK, OPTICAL DISK DRIVE APPARATUS, AND OPTICAL DISK TRACKING METHOD

This application is a divisional of application Ser. No. 09/556,437 filed on Apr. 24, 2002, which is a divisional of application Ser. No. 09/332,071, filed on Jun. 14, 1999 and issued as U.S. Pat. No. 6,201,775 on Mar. 13, 2001, which is a divisional of application Ser. No. 08/829,119, filed on Apr. 10, 1997 and issued as U.S. Pat. No. 6,091,699 Jul. 18, 2000, the entire contents of which are hereby incorporated by reference and for which priority is claimed under 35 U.S.C. § 120; and this application claims priority of Application No. 8-92885 filed in Japan on Apr. 15, 1996 under 35 U.S.C. § 119.

BACKGROUND OF THE INVENTION

This invention relates to an optical disk in which signals are recorded both onto recording tracks in depressed portions formed by guide grooves and onto recording tracks on projecting portions between the guide grooves, and to an optical disk apparatus, and an optical disk tracking method.

As a data recording method for a large-capacity rewritable optical disk, a land/groove recording method in which data is recorded both in guide grooves (sometimes denoted by G) and on lands (sometimes denoted by L) to increase a recording density, has been proposed. When this method is used, the recording density can be increased because the recording track pitch can be halved compared to an optical disk having the same groove pitch but for which this method is not used. Grooves and lands may also be referred to as depressed portions and projecting portions, respectively.

As a conventional land/groove recording optical disk, there is provided an optical disk shown in FIG. 13, for example. It is described in Japanese Examined Patent Publication 63-57859. As shown in FIG. 13, grooves 94 and lands 95 are formed by means of guide grooves inscribed on the substrate of the disk, and a recording film 91 is formed thereon. Recording marks 92 are formed on the recording film 91 extending both on the grooves 94 and the lands 95. The grooves 94 and the lands 95 form continuous data recording tracks, respectively. A light-focused spot 93 of an optical disk drive apparatus for performing data recording and reproduction onto this recording medium records or reproduces data while scanning either of the recording tracks. With a conventional land/groove recording format, guide grooves are continuous on a disk. Thus, each of the data recording tracks of the grooves 94 and the data recording tracks of the lands 95 form a single continuous recording spiral.

A single spiral land/groove format is described next.

FIG. 14 shows the configuration of an optical disk having a format in which each data recording track of grooves (hereinafter also referred to as a groove track) 94 having a length corresponding to a revolution of the disk and each data recording track of lands (hereinafter also referred to as a land track) 95 also having a length corresponding to a revolution of the disk are connected alternately to form a data recording spiral. An example of optical disks having the format shown in FIG. 14 in which groove tracks 94 and land tracks 95 are connected alternately to form a data recording spiral, is described in Japanese Unexamined Patent Publication 4-38633 and Japanese Unexamined Patent Publication 6-274896. The format of such optical disks is herein referred to as the single spiral land/groove format or the SS-LUG format.

An SS-L/G format optical disk has continuous data recording tracks on the disk, so that it is suitable for continuous data recording and reproduction. When an optical disk is used as a video file, for example, continuous data recording and reproduction is essential. However, in a conventional land/groove recording optical disk shown in FIG. 13, the land tracks 95 and the groove tracks 94 form separate data recording spirals. Thus, when data recording or reproduction is performed continuously from the land tracks 95 to the groove tracks 94, for example, it is interrupted at least at one portion of the disk due to an access between the land tracks 95 and the groove tracks 94. The same interruption occurs when data recording or reproduction is performed continuously from the groove tracks 94 to the land tracks 95. In order to avoid such an interruption in the data recording or reproduction, it is necessary to provide an additional buffer memory, which raises the cost. If optical disk is of a single spiral land/groove format, no such an additional buffer memory is necessary.

In an SS-L/G format optical disk, however, a tracking servo polarity must be switched at every revolution of the disk. Since the detection of this tracking servo polarity switching point is difficult, application of the tracking servo is also difficult. For this reason, the SS-L/G format optical disk has found few practical applications. Although formatting an SS-L/G format optical disk is disclosed in Japanese Unexamined Patent Publication 4-38633 and Japanese Unexamined Patent Publication 6-274896 mentioned above, nothing is disclosed about a specific method of detecting a tracking servo polarity switching point.

In order to apply a tracking servo to an SS-L/G format optical disk, it is necessary to accurately detect between alternating points between alternating groove tracks and land tracks, and to switch a tracking servo polarity to be set for tracking a groove track or a land track. Examples of methods of detecting connecting alternating points connecting groove tracks and land tracks are disclosed in Japanese Unexamined Patent Publication 6-290465 and Japanese Unexamined Patent Publication 7-57302.

In the method disclosed in Japanese Unexamined Patent Publication 6-290465, depressed portions and projecting portions of a constant frequency are provided at the connecting points between land tracks and groove tracks. FIG. 15 shows the configuration of an optical disk recording medium described in the above-mentioned publication. Referring to FIG. 15, the connecting points are at A1, A2, A3, B1, B2, etc. Between the connecting points next to each other either a land or a groove continues, and positional data such as a track address is represented by wobbling grooves.

In the method disclosed in Japanese Unexamined Patent Publication 7-57302, a flat part having no grooves or a predetermined pattern of pits are provided at the connecting points between groove tracks and land tracks. FIG. 16A and FIG. 16B show the configuration of an optical disk recording medium described in the above-mentioned publication. FIG. 16A shows an example of a flat part provided at a connecting point, while FIG. 16B shows an example of a predetermined pattern of pits. In this prior art example, nothing is disclosed about positional data such as a track address, and it can be regarded that either a groove or a land continues between the connecting points on a spiral.

Now, description is directed to a case where pit pattern data for detecting a connecting point is provided on an optical disk in which each of the data recording tracks is composed of a plurality of data recording sectors having their own identification data. In the method of providing identification data by wobbling grooves, no interrupting portion is present in the groove of a data recording part in one revolution except for a connecting point. Thus, the problem of erroneous detection of a connecting point will not arise. However, the function of recording data onto a sector is restricted. For instance, data recording or reproduction in units of short sectors is difficult.

In contrast with an optical disk of the above-mentioned configuration, in the case of an optical disk such as a conventional ISO magneto-optical disk having a format in which preformatted identification data parts representing addresses and data recording parts recording user data are arranged separately on data recording tracks, if identification data and a connecting point between a groove and a land are represented in the same recording form, the problem of erroneous detection of the connecting point will arise. In order to avoid such a problem, it is necessary to ensure discrimination between the pit pattern of identification data and the pit pattern for detecting a connecting point between a groove and a land. In the example disclosed in Japanese Unexamined Patent Publication 7-57302, since the pit sequence as shown in FIG. 16B is provided only at connecting points, the problem of erroneous detection of the connecting point will not occur. However, when identification data is preformatted with a pit pattern similar to that for detecting a connecting point and arranged in a data recording track, it is necessary to reproduce the pit data in the connecting point with precise pit synchronization so as to detect the connecting point with a high reliability. This applies to all cases where a connecting point is detected according to the pit pattern, regardless of how the connecting point is represented, such as by means of a pit pattern of a constant frequency or a predetermined pit pattern.

In order to reproduce pit data with precise pit synchronization, establishment of stable tracking is a prerequisite. This means that a connecting point between a groove and a land should be correctly detected and tracking should be switched accordingly. In order to do this, it is necessary to distinguish between the pit pattern for detecting the connecting point and the pit pattern for the identification data and to reproduce the pit data for the connecting point with the precise pit synchronization. This falls into a circular dependency. It indicates that, according to the prior art, in an optical disk having a format in which each of the data recording tracks is composed of a plurality of track sectors having a preformatted identification part and a data recording part arranged separately, reliable detection of a connecting point between a groove and a land which is essential for implementing a single spiral land/groove format is difficult.

Now, a method of inserting identification signal prepits which has been proposed for a conventional land/groove recording optical disk is described. In the conventional land/groove recording method, three methods of inserting identification signal prepits as shown in FIG. 17A to FIG. 17C are known. In the method illustrated in FIG. 17A, also referred to as a land/groove individual addressing method, each of land track sectors and groove track sectors has their own sector address. If the width of prepits representing an identification signal were set to be identical to the width of a groove, identification signal prepits of the adjacent track sectors would be connected, and no identification signal could be detected. For this reason, the width of identification signal prepits is set to be smaller than that of a groove, and normally is set to be about half the width of a groove.

However, unless the diameter of a laser beam for inserting prepits is made different from that for forming a groove during the fabrication of a master disk in the mastering process, continuous formation of a groove and prepits having different widths as described above cannot easily be performed. For this reason, two separate laser beams for forming grooves and forming the prepits must be used for cutting the master disk. If two laser beams are not aligned during the formation of grooves and prepits, there will be a tracking offset between the reproduction of identification signal prepits and the recording or reproduction of data recording signals. The quality of reproduced data will therefore deteriorate. More specifically, due to the deviation of tracking, an error rate of the reproduced data will increase, lowering the reliability of the reproduced data. Thus, highly accurate positioning of the two laser beams is required, which will be a factor for raising the cost of fabrication of master disk.

In view of the above-mentioned problem, and in terms of the accuracy and the cost of the fabrication of an optical disk, the method illustrated in FIG. 17B or FIG. 17C, capable of forming grooves and prepits with a single laser beam is preferable. FIG. 17B and FIG. 17C respectively show the methods capable of inserting prepits having substantially the same width as that of a groove.

FIG. 17B shows a conventional optical disk described in Japanese Unexamined Patent Publication 6-176404 and which uses a method also referred to as a land/groove common address method. In this method, identification signal prepits PP are disposed around the center of a pair adjacent of a groove and land tracks, and the same identification signal prepits are shared by a groove track G and a land track L adjacent to each other.

FIG. 17C shows a conventional optical disk described in Japanese Unexamined Patent Publication 7-110944 and which uses a method referred to as a time-division L/G individual address method. In this method, individual addresses are provided for land tracks L and groove tracks G. The positions at which the identification signal prepits PP for the adjacent land tracks and groove tracks are arranged are shifted relative to each other in a direction parallel to the tracks such that the identification signal prepits do not neighbor each other.

When considering a method of providing identification signal data and data for detecting a connecting point, immunity to defects should also be considered. For switching a tracking polarity by reading the identification signal data and the data for detecting a connecting point, discrimination between a groove and a land should not fail in the presence of a slight defect on the disk. It is essential to perform correct detection of a connecting point, even if there are typical defects on the medium such as fine flaws, and defective holes formed on a recording film and causing reduction of index of reflection.

When considering a method of providing the identification signal data and the data for detecting a connecting point, consideration should be also given to a servo characteristic.

The SS-L/G format provides a higher track density because both lands and grooves are used for recording data. However, because of this higher track density, when a tracking offset is increased, the quality of a reproduced signal deteriorates because of crosstalk from an adjacent track and the error rate increases due to an increase in jitter, for example. Crosserase of data on an adjacent track, which means erasure of part of data on an adjacent track, may also occur during data recording. An error which will cause a tracking offset is generated due to combined effects of the optical head system, the arrangement of tracks in an optical disk, and the servo systems. For this reason, such an error generally has different levels for a land track and a groove track.

In order to avoid crosstalk and crosserase, different offset compensation is required for each of a land track and a groove track. In the conventional land/groove recording method, i.e., the method in which groove tracks and land tracks form separate data recording spirals, offset compensation can be made for the respective spirals of the land tracks or the groove tracks during the continuous tracking operation, taking a certain period. Then, after the adjustment, the amount of compensation can be retained. Thus, offset compensation can be achieved easily.

With the SS-L/G format optical disk, however, tracking polarity switching between a land track and a groove track must be made at every revolution of the disk. For this reason, it is necessary to make tracking offset compensation accurately and quickly. As described above, with the SS-L/G format optical disk, a method of inserting identification signals taking account of tracking offset compensation is required.

The above-mentioned conventional methods of inserting identification signals for a land/groove recording optical disk did not provide the characteristics required of a SS-L/G format disk, for dealing with the medium defects or tracking offset compensation.

In the case of the land/groove common address method as illustrated in FIG. 17B, for example, identification signal prepits are disposed on one side of a land track or a groove track. Thus, a tracking offset keeps increasing the reproduction of identification signals. On the other hand, in the case of the L/G individual address method as illustrated in FIG. 17C, detection of a tracking offset is difficult, which is also true for the case of FIG. 17B.

The operation associated with driving an optical disk is next described. When a control system for changing the rotational speed during the driving operation of the optical disk is used, quick and accurate detection of a connecting point between a land and a groove will become more difficult. However, with an optical disk used for a video application mainly requiring continuous data recording and reproduction, the above-mentioned control system should be used.

In case emphasis is placed on the compatibility with an read-only optical disk, a phase-change medium is suitable as a rewritable optical disk. This is because, with this phase-change medium, the optical system can be commonly used with the read-only optical disk. However, with the phase-change medium having data recording and reproduction performance which can be used in practice, the range of data recording linear velocities over which the data recording and reproduction characteristic associated with the PWM data recording operation is satisfied is narrow. More specifically, when an optical disk is controlled with the CAV (Constant Angular Velocity), the rotational speed of the disk in the inner radial part and the rotational speed of the disk in the outer radial part will be identical, and the recording linear velocity of the disk in the outer radial part will be approximately 2.5 to 3 times faster than that in the inner radial part. The currently-available phase-change medium cannot be used over this wide range of data recording linear velocities.

Where the rotation of the disk is CAV-controlled, if the rotational speed of the disk in the inner radial part is set to achieve a required data rate, when the outer radial part of the disk is scanned, the signal processing circuit must perform high speed processing nearly three times faster than that for the inner radial part. For this reason, implementation of the required function with hardware of a low cost will be difficult. Further, when considering the video application of the disk, it is preferable that the optical disk have a constant data rate between the outer radial part and the inner radial part.

Thus, for a rewritable optical disk used for the data recording of a digital video, because of the two reasons of the characteristic of the medium and the circuit performance, a ZCLV (Zoned Constant Linear Velocity) method is practical. In this method, an optical disk is divided radially into a plurality of zones, and the rotational speed of the disk is switched from one zone to another to obtain a constant data transfer rate and a substantially constant linear velocity throughout the zone.

When the ZCLV method is used, the following problems will arise. In the ZCLV method, the rotational speed of the disk need be changed while the light spot crosses a zone boundary. In addition, when the light spot has moved from one zone to another, a certain time is required until the rotational speed of the disk settles (or stabilizes) at the stipulated rotational speed for the zone to which the light spot has moved. During the settling time, the interval between the sectors varies. Then, sector synchronization may be temporarily lost, in which case it is necessary to re-establish the sector synchronization quickly. It is also necessary to detect a connecting point between a land track and a groove track quickly and accurately.

An optical disk drive apparatus for driving a conventional land/groove recording optical disk is described next. FIG. 18 is a block diagram showing the configuration of the conventional optical disk drive apparatus described in Japanese Unexamined Patent Publication 6-176404. Referring to FIG. 18, reference numeral 100 indicates an optical disk, 101 indicates a semiconductor laser, and 102 indicates a collimator lens for converting a laser beam from the semiconductor laser 101 into a parallel beam. Reference numeral 103 indicates a half mirror, 104 indicates an objective lens for focusing the parallel beam which has passed through the half mirror 103 onto the optical disk, and reference numeral 105 indicates a photodetector for receiving the beam which has been reflected from the optical disk 100, and has passed through the objective lens 104 and the half mirror 103. The photodetector 105 includes two light-receiving parts divided by a boundary line extending in a direction parallel and to the track direction of the disk so as to obtain a tracking error signal. Reference numeral 106 indicates an actuator supporting the objective lens 104, and a portion 107 enclosed by a dotted line represents an optical head mounted on a head base. Reference numeral 108 indicates a differential amplifier for receiving detection signals from the photodetector 105, and reference numeral 109 indicates a polarity reversal circuit for receiving the tracking error signal from the differential amplifier 108, and a control signal T1 from a system controller 121 which will be hereinafter described, and for supplying the tracking error signal to a tracking controller 110. The polarity of the tracking control is such that when the tracking error signal is supplied from the differential amplifier 108 to the tracking controller 110 without having its polarity reversed, the light spot is pulled into a groove track. Reference numeral 110 indicates the tracking controller for receiving the output signal from the polarity reversal circuit 109 and a control signal T2 from the system controller, and for supplying tracking control signals to a driver 120 and a traverse controller 116. Reference numeral 111 indicates a summing amplifier for receiving the detection signals from the photodetector 105 and for supplying the sum signal, and reference numeral 112 indicates a waveform shaping circuit for receiving a high-frequency component of the output signal from the summing amplifier 111 and for supplying digital signals to a reproduced signal processor 113 and an address reproduction circuit 114 which will be hereinafter described. Reference numeral 113 indicates the reproduced signal processor for supplying reproduced data to an output terminal. Reference numeral 114 indicates the address reproduction circuit for receiving the digital signal from the waveform shaping circuit 112 and for supplying an address signal to an address calculator 115 which will be hereinafter described. Reference numeral 115 indicates the address calculator for receiving the address signal from the address reproduction circuit 114 and the control signal T1 from the system controller 121 and for supplying the correct address signal to the system controller 121. Reference numeral 116 indicates a traverse controller for providing a driving current to a traverse motor 117 which will be hereinafter described, in response to a control signal T3 from the system controller 121. Reference numeral 117 indicates the traverse motor for moving the optical head 107 in the radial direction of the optical disk 100. Reference numeral 118 indicates a recording signal processor for receiving recording data and supplying a recording signal to a laser diode (LD) driver 119 which will be hereinafter described. The LD driver 119 receives a control signal T4 from the system controller 121 and the recording signal from the recording signal processor 118 and supplies a driving current to the semiconductor laser 101. Reference numeral 120 indicates a driver for supplying a driving current to the actuator 106. Reference numeral 121 indicates the system controller for supplying the control signals T1 through T4 to the tracking controller 110, the traverse controller 116, the address calculator 115, the polarity reversal circuit 109, the recording signal processor 118, and the LD driver 119.

The operation of the conventional optical disk drive apparatus having the above-mentioned configuration is described with reference to FIG. 18. The laser beam emitted from the semiconductor laser 101 is made to be parallel by the collimator lens 102, passed through the beam splitter 103, and focused onto the optical disk 100 by the objective lens 104. The laser beam reflected from the optical disk 100 contains data on recording tracks, and passed through the objective lens 104 and directed to the photodetector 105 by the beam splitter 103. The photodetector 105 converts the intensity and the distribution of light in the incoming light beam to electrical signals, and supplies them to the differential amplifier 108 and the summing amplifier 111. The differential amplifier 108 applies a current-to-voltage conversion (I-V conversion) to the input currents and supplies the potential difference between the two input signals, as a push-pull signal.

The polarity reversal circuit 109 determines whether a track being accessed is a land track or a groove track in accordance with the control signal T1 from the system controller, and reverses a polarity only when the track being accessed is a land track, for example. The tracking controller 110 supplies a tracking control signal to the driver 120 according to the level of the tracking error signal. The driver 120 supplies the driving current to the actuator 106 in accordance with the tracking control signal and controls the position of the objective lens 104 laterally of the data recording tracks. The light spot thereby scans the data recording tracks accurately.

On the other hand, the summing amplifier 111 applies a current-to-voltage conversion (I-V conversion) to output currents from the light-receiving parts 105, adds the input signals, and supplies the result as the sum signal to the waveform shaping circuit 112. The waveform shaping circuit 112 slices the data signal and the address signal in analog form with a predetermined threshold value and supplies pulse trains to the reproduced signal processor 113 and the address reproduction circuit 114, respectively. The reproduced signal processor 113 demodulates the input digital data signal, applies error correction, and supplies it as reproduced data.

The address reproduction circuit 114 demodulates the input digital address signal and supplies the result of the demodulation as disk position data to the address calculator 115. The address calculator 115 calculates the address of a sector being accessed, based on the address signal read from the optical disk 100 and the land/groove signal from the system controller 121 indicating whether a track being accessed is a land track or a groove track. The manner of address calculation will be described later. Based on the address signal, the system controller 121 determines whether the light beam is scanning a desired sector.

At the time of moving the optical head, in response to the control signal T3 from the system controller 121, the traverse controller 116 supplies a driving current to the traverse motor 117 so as to move the optical head 107 to a target track. At this time, the tracking controller 110 temporarily stops a tracking servo in response to the control signal T2 from the system controller 121. During normal data reproduction, the traverse motor 117 is driven in response to the tracking error signal from the tracking controller 110 so as to move the optical head 107 gradually in the radial direction of the disk with the progress of data reproduction. The recording signal processor 118 adds error correction codes to the recording data which have been supplied at the time of data recording, and supplies an encoded recording signal to the LD driver 119. When the system controller 121 has set the mode of the LD driver 119 to the data recording mode by means of the control signal T4, the LD driver 119 modulates a driving current to be applied to the semiconductor laser 101 in accordance with the recording signal. The intensity of a light spot of the beam emitted onto the optical disk 100 is thereby changed according to the recording signal, and recording marks are formed.

On the other hand, during data reproduction, the mode of the LD driver 119 is set to the data reproduction mode by means of the control signal T4, and the LD driver 119 controls the driving current in such a manner that the semiconductor laser 101 emits a laser beam of a constant intensity. The recording marks and prepits on the data recording tracks can be thereby detected.

In such a conventional optical disk drive apparatus, an identification signal is reproduced based on the sum signal having been processed by the waveform shaping circuit 112. In an SS-L/G format disk as well, a connecting point between a land track and a groove track will be reproduced, based on the sum signal having been processed by the waveform shaping circuit 112. For this reason, in order to detect a connecting point with a high reliability, it is necessary to set a pit pattern for an identification signal representing address data and a pit pattern for detecting a connecting point to be quite different.

Even where reproduction of data or an address is not ready because it is immediately after a light spot has been pulled into a track, a connecting point must be detected. Thus, a pit pattern for detecting a connecting point should be reproducible even when the synchronization has not been achieved. For this purpose, it is necessary to allocate long pits, and to provide prepits of a pit pattern of a low frequency, i.e., of long pits. In a large-capacity optical disk which aims at the smallest possible redundancy and increase of an effective recording density, allotting long pits to the pit pattern is not desirable.

A conventional land/groove recording optical disk medium and a conventional optical disk drive apparatus are configured as described above. Thus, when the method of inserting identification signals used in the conventional optical disk is applied to a single spiral land/groove recording format, it is difficult to detect a connecting point between a land track and a groove track with a high reliability.

Further, if a pit pattern permitting discrimination from the identification signal and detection of a connecting point easily is allotted to the connecting point, long pits are necessary. An effective recording density is thereby reduced.

With a single spiral land/groove format, tracking offset compensation needs to be carried out quickly and accurately. However, detection of a tracking offset is difficult.

SUMMARY OF THE INVENTION

The present invention has been made to solve the above-described problems, and its object is to provide an optical disk medium of a single spiral land/groove format in which a connecting point between a land track and a groove track can be detected easily and correctly and a tracking servo polarity can be switched accordingly, without reduction in the effective recording density, and in which tracking offset compensation can be made quickly and accurately. The invention also aims at providing an optical disk drive apparatus for driving the above-recited optical disk medium, and a tracking method for the optical disk medium.

It is another object of the present invention to provide an optical disk medium with which quick re-establishment of sector synchronization after the passage of a zone boundary by a light spot is possible and an access speed is therefore improved, where a single spiral land/groove format is applied to the ZCLV method in which the rotational speed of the disk and the number of sectors vary depending the zone, or the ZCAV method in which the number of sectors or a data frequency vary depending on the zone. The invention also aims at providing an optical disk drive apparatus for driving the above-recited optical disk medium and a tracking method for the disk.

According to one aspect of the invention, there is provided an optical disk medium using both grooves formed annularly on the disk and lands between the grooves for data recording parts, and recording data signals by a localized optical constant variation or a change in a physical shape due to application of a laser beam, the recording tracks of grooves each corresponding to one revolution of the disk medium, and the recording tracks of lands each corresponding to one revolution of the disk medium being connected alternately to each other so as to form a continuous recording spiral; wherein said each of the recording tracks comprises an integer number of recording sectors of equal lengths, an identification signal area containing an identification signal representing address data or the like is provided at a leading end of each of the recording sectors, and positioned to align in the radial direction with an identification signal area of an adjacent recording sector, the identification signal area in each of the recording sectors of the grooves contains the identification signal, a first part of the identification signal area is shifted by a predetermined distance in one radial direction from a center of the groove, and a second part of the identification signal area is shifted by the same distance in the other radial direction from the center of the groove, and the identification signal area in each of the recording sectors of the lands does not contain the identification signal.

With the above arrangement, in an optical disk of a single spiral land/groove recording, the arrangement of identification signals is utilized to detect a tracking polarity and a land/groove track connecting point reliably. As a result, stable tracking can be performed, and a single spiral land/groove recording format can be realized in an optical disk of the sectorized configuration.

Moreover, by inserting tracking polarity information into an identification signal, a land/groove track connecting point can be detected reliably and information required for stable tracking can be provided to an optical disk drive apparatus. This enables stable tracking, and a single spiral land/groove recording format can be realized for an optical disk of the sectorized configuration.

At the same time, erroneous recognition of tracking information caused by a defect, a flaw, or dust on the medium can be eliminated, and reliability of the tracking and the operations of the optical disk drive apparatus can be improved.

Further, because accurate tracking is enabled by compensating a tracking servo offset easily, reliability of data can be improved.

Further, with this optical disk, the grooves and identification signals can be formed easily using a single laser beam at the time of fabricating the master disk in mastering process of a single spiral land/groove recording format, the cost of fabrication of the disk can be reduced.

As a result, recording and reproduction can be performed throughout an entire disk continuously without seeking between a land track and a groove track, so that it is possible to achieve continuous reproduction of moving pictures for twice as long a time as in a prior art. Further, it is not necessary to provide a buffer memory for storing data to avoid interruption of reproduction during seeking between a land track and a groove track, the cost for the apparatus for recording and reproducing data on the optical disk medium can be reduced.

For the reasons set forth above, a single spiral land/groove recording which is suitable for a video file and a data file can be realized easily.

It may be so arranged that the distance by which the first part or the second part of the identification signal area in each of the recording sectors of the grooves in the radial direction from the center of the groove is substantially half a recording track width.

With the above arrangement, the grooves and identification signals can be formed easily using a single laser beam at the time of fabricating the master disk in the mastering process of a single spiral land/groove recording format, the cost of fabrication of the disk can be reduced.

Further, because accurate tracking is enabled by compensating a tracking servo offset easily, reliability of data can be improved.

It may be so arranged that the first part and the second part of the identification signal area in said each of recording sectors of the grooves each further contains tracking polarity information for the recording sector to which the first part or the second part of the identification signal area belongs.

With the above arrangement, in an optical disk of a single spiral land/groove recording, tracking polarity information and address data are recorded multiple times, so that an error rate in reading address data in an identification signal can be reduced and reliability of reading tracking polarity information can be improved.

According to another aspect of the invention, there is provided an optical disk drive apparatus comprising:

an optical head having at least a push-pull tracking sensor;

a differential signal detector for generating a differential signal based on signals from the tracking sensor;

a differential signal waveform shaping circuit for generating binarized differential signals from the differential signal; and a reproduced differential signal processor for producing an identification signal gating signal corresponding to the identification signal area, from the binarized differential signals;

wherein when data is recorded on and reproduced from the optical disk medium, timing of a recording sector identification signal is detected according to the waveform of the binarized differential signal, and sector synchronization is ensured based on the timing.

With the above arrangement, sector synchronization is detected quickly, accurately, and easily for a single spiral land/groove recording disk. For this reason, a connecting point between a land track and a groove track can be detected reliably and easily.

In the ZCLV method in which the rotational speed of the disk and the number of sectors vary from one zone to another, sector synchronization after the passage of a zone boundary by a light spot can be re-established quickly. Thus, the effect of the invention is remarkable, and an access speed can be increased. In the ZCAV method as well, in which the number of sectors and a data frequency vary from one zone to another, sector synchronization after the passage of a zone boundary by a light spot can be re-established quickly. Thus, the effect of the invention is remarkable, and an access speed can be increased.

According to another aspect of the invention, there is provided an optical disk drive apparatus comprising:

an optical head having at least a push-pull tracking sensor;

a differential signal detector for generating a differential signal based on signals from the tracking sensor;

a differential signal waveform shaping circuit for generating binarized differential signals from the differential signal;

a reproduced differential signal processor for determining whether the recording sector is in a land or a groove based on the binarized differential signals and for supplying a polarity detection signal; and a polarity controller for setting a tracking servo polarity by using the polarity detection signal;

wherein when data is recorded on or reproduced from the optical disk medium, determination is made, during reproduction of the first part and the second part of an identification signal area in said each of the recording sectors, as to whether the recording sector is a land sector or a groove sector according to the radial shift directions represented by the binarized differential signals, and the order of the shift directions; and a tracking servo polarity for tracking a data recording part of the recording sector is set, based on the result of the determination.

With the above arrangement, in an optical disk of a single spiral land/groove recording, the arrangement of identification signals is utilized to detect a tracking polarity and a land/groove track connecting point reliably. A single spiral land/groove recording format can therefore be realized in an optical disk of the sectorized configuration.

As a result, recording and reproduction can be performed throughout an entire disk continuously without seeking between a land track and a groove track, so that it is possible to achieve continuous reproduction of moving pictures for twice as long a time as in a prior art. Further, it is not necessary to provide a buffer memory for storing data to avoid interruption of reproduction during seeking between a land track and a groove track, the cost for the apparatus for recording and reproducing data on the optical disk medium can be reduced.

For the reasons set forth above, a single spiral land/groove recording which is suitable for a video file and a data file can be realized easily.

According to another aspect of the invention, there is provided an optical disk drive apparatus comprising:

an optical head having at least a push-pull tracking sensor;

a sum signal detector for generating a sum signal based on signals from the tracking sensor;

a sum signal waveform shaping circuit for generating binarized sum signals from the sum signal;

a reproduced signal processor for reproducing data from the binarized sum signals; and a polarity controller for setting a tracking servo polarity;

a sum signal waveform shaping circuit for generating binarized sum signals from the sum signal;

a reproduced signal processor for reproducing data from the binarized sum signals; and a polarity controller for setting a tracking servo polarity;

wherein when data is recorded on and reproduced from the optical disk medium, determination is made as to whether each of the recording sectors is a land sector or a groove sector according to the tracking polarity information contained in the reproduced data from the identification signal areas of the recording sectors, and a tracking servo polarity for tracking a data recording part of the recording sector is set according to the polarity information.

With the above arrangement, in an optical disk of a single spiral land/groove recording, the information of identification signals is utilized to detect a tracking polarity and a land/groove track connecting point reliably. A single spiral land/groove recording format can therefore be realized in an optical disk of the sectorized configuration.

As a result, recording and reproduction can be performed throughout an entire disk continuously without seeking between a land track and a groove track, so that it is possible to achieve continuous reproduction of moving pictures for twice as long a time as in a prior art. Further, it is not necessary to provide a buffer memory for storing data to avoid interruption of reproduction during seeking between a land track and a groove track, the cost for the apparatus for recording and reproducing data on the optical disk medium can be reduced.

For the reasons set forth above, a single spiral land/groove recording which is suitable for a video file and a data file can be realized easily.

According to another aspect of the invention, there is provided an optical disk drive apparatus comprising:

an optical head having at least a push-pull tracking sensor;

a sum signal detector for generating a sum signal based on signals from the tracking sensor;

a sum signal waveform shaping circuit for generating binarized sum signals from the sum signal;

a differential waveform shaping circuit for generating binarized signals from the differential signal;

a reproduced differential signal processor for determining whether the recording sector is in a groove or a land, based on the binarized differential signals, and for supplying a polarity detection signal; and a polarity controller for setting a tracking servo polarity by using the polarity detection signal;

wherein when data is recorded on and reproduced from the optical disk medium, a connecting point between a groove track and a land track is detected based on the waveform of the binarized differential signal, and a tracking servo polarity for tracking a data recording part in the recording sector is determined, determination is made as to whether the sector is a groove recording sector or a land recording sector in accordance with the tracking polarity information contained in the reproduced data from the identification signal area of each of the recording sectors, and a tracking servo polarity for a data recording part of the recording sector is set in accordance with both the tracking servo polarity determined and the tracking polarity information reproduced.

With the above arrangement, detection of the shift direction of an identification signal and detection of land/groove track polarity information in the identification signal are both used in a single spiral land/groove recording optical disk, a land/groove track connecting point can be detected with a higher reliability, during tracking and after passage of a zone boundary, and stable tracking can be achieved.

Thus, in addition to the effects obtained by the arrangement recited earlier, an even higher reliability in tracking and operation of the apparatus can be obtained.

According to another aspect of the invention, there is provided an optical disk tracking method, wherein after tracking has been applied to either of a groove or a land, in case that a differential signal generated on the basis of signals from the tracking sensor or a differential band-limited signal obtained by filtering the differential signal through a band-pass filter is more than a first specified value for a first predetermined period and then is less than a second specified value for a second predetermined period, a tracking servo polarity is set such that a predetermined one of the groove or the land is tracked, in case that a differential signal generated on the basis of signals from the tracking sensor or a differential band-limited signal obtained by filtering the differential signal through a band-pass filter is less than a second specified value for a first predetermined period and then is more than a first specified value for a second predetermined period, a tracking servo polarity is set such that the other of the groove or the land is tracked.

With the above arrangement, in an optical disk of a single spiral land/groove recording, the arrangement of identification signals is utilized to detect a tracking polarity and a land/groove track connecting point reliably. As a result, stable tracking can be performed, and a single spiral land/groove recording format can be realized in an optical disk of the sectorized configuration.

At the same time, erroneous recognition of tracking information caused by a defect, a flaw, or dust on the medium can be eliminated, and reliability of the tracking and the operations of the optical disk drive apparatus can be improved.

As a result, recording and reproduction can be performed throughout an entire disk continuously without seeking between a land track and a groove track, so that it is possible to achieve continuous reproduction of moving pictures for twice as long a time as in a prior art. Further, it is not necessary to provide a buffer memory for storing data to avoid interruption of reproduction during seeking between a land track and a groove track, the cost for the apparatus for recording and reproducing data on the optical disk medium can be reduced.

For the reasons set forth above, a single spiral land/groove recording which is suitable for a video file and a data file can be realized easily.

According to another aspect of the invention, there is provided an optical disk tracking method, wherein a tracking error signal is sampled and held immediately before a light spot scans the identification signal area of the recording sector, tracking control is stopped while the light spot is scanning the identification signal area, and determination is made as to whether the sector is a groove recording sector or a land recording sector based on at least the tracking polarity information contained in the reproduced data from the identification signal area, and a tracking servo polarity for tracking the data recording part in the recording sector is set according to the result of the determination, and tracking control is resumed at the data recording part.

With the above arrangement, in an optical disk of a single spiral land/groove recording, the information of identification signals is utilized to detect a tracking polarity and a land/groove track connecting point reliably. As a result, stable tracking can be performed, and a single spiral land/groove recording format can be realized in an optical disk of the sectorized configuration.

As a result, recording and reproduction can be performed throughout an entire disk continuously without seeking between a land track and a groove track, so that it is possible to achieve continuous reproduction of moving pictures for twice as long a time as in a prior art. Further, it is not necessary to provide a buffer memory for storing data to avoid interruption of reproduction during seeking between a land track and a groove track, the cost for the apparatus for recording and reproducing data on the optical disk medium can be reduced.

For the reasons set forth above, a single spiral land/groove recording which is suitable for a video file and a data file can be realized easily.

BRIEF DESCRIPTION OF THE DRAWINGS

FIG. 7A to FIG. 7I are detailed timing charts for explaining a method of identifying a tracking polarity of a data recording sector according to the second embodiment of the present invention;

DETAILED DESCRIPTION OF THE PREFERRED EMBODIMENTS

Embodiments of this invention will be described with reference to the drawings.

First Embodiment

This embodiment relates to a single spiral land/groove (SS-L/G) format optical disk medium. Description of this embodiment will be made on the assumption that the optical disk medium is divided into a plurality of annular zones by circular boundaries.

Figure 1:
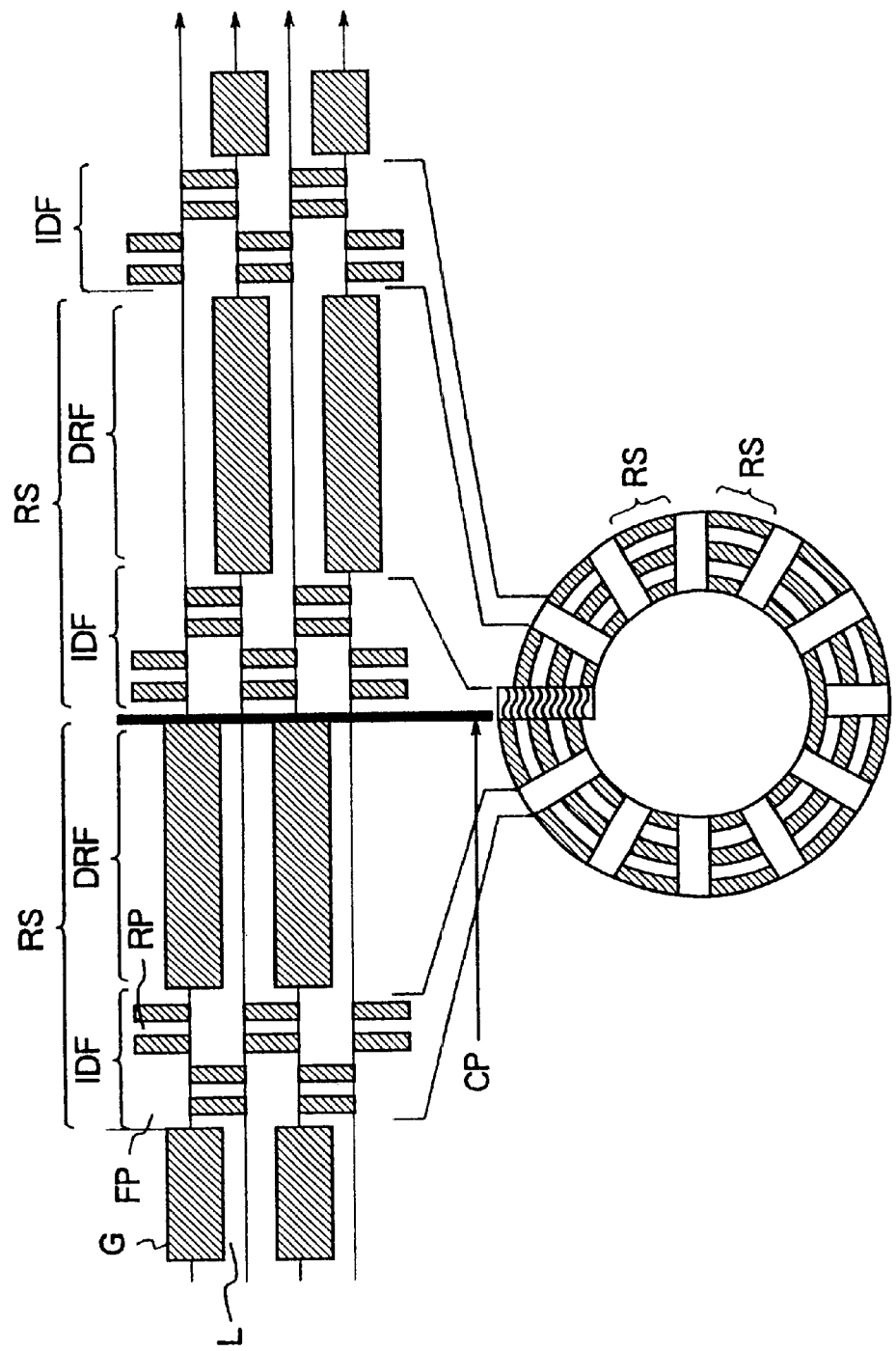
FIG. 1 is a drawing schematically showing a track layout of an optical disk medium according to the first embodiment of the present invention.

FIG. 1 shows a track layout of an optical disk medium according to the first embodiment of the present invention, and shows the arrangement of tracks and recording sectors within one zone, and a configuration of the recording sector. As shown in FIG. 1, a track (groove track) G of a groove (depressed portion), and a track (land track) L of a land (projected portion) are connected at connecting points CP alternately at every revolution to form a recording spiral (a recording track in a spiral form). It is assumed here that the width of a groove G and the width of a land L are identical. The width of a groove or a land is equal to a track pitch and is half a groove interval.

A recording track corresponding to one revolution of the disk is composed of an integer number of recording sectors. As an example it is shown to be composed of 12 sectors. At the leading end of each sector, a preformatted identification area (identification signal field) IDF is added. An optical disk in this embodiment is different from the optical disk according to the prior art in that a land track and a groove track are discontinuous because of the prepits in the identification signal area IDF. In other words, a land track and a groove track are connected via the prepits in the identification signal area IDF, and the identification signal area IDF in each sector RS has (or contains) identification data for identifying the sector and also has (or contains) information for detecting a connecting point CP between a groove track and a land track.

Each of the recording sectors which constitute a recording track has a preformatted identification signal area at its leading end and a data recording area DRF capable of recording user data and various management data.

Figure 2:
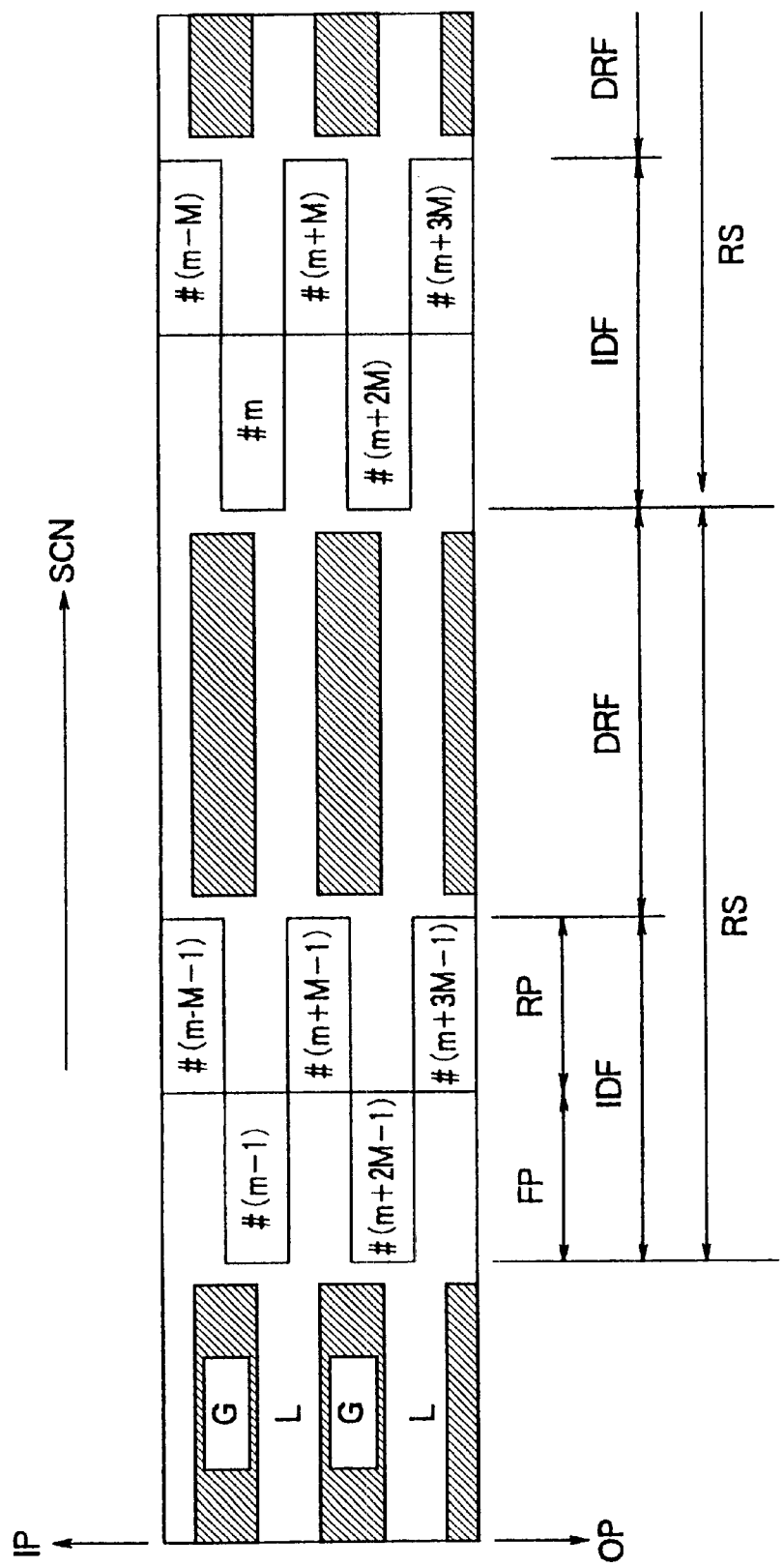
FIG. 2 is a drawing schematically showing the arrangement of identification signals within data recording sectors and their addresses on an optical disk medium according to the first embodiment of the present invention.

FIG. 2 schematically shows the arrangement of prepits in identification signal areas within recording sectors RS on an optical disk and their address values according to the first embodiment of the present invention. m (which is an integer) represents the address of the recording sector, and M (which is also an integer) represents the number of sectors per track. IP represents the direction toward the inner radial part of the disk, while OP represents the direction toward the outer radial part of the disk. SCN represents the direction of the scanning of the light spot. The identification signal area consists of a front part FP and a rear part RP as viewed in the scanning direction. The front part FP is shifted by half a groove width radially outwards from a groove. The rear part RP is shifted by half a groove width radially inwards from the groove.

A method of providing identification data such as a sector address in the identification signal area is described next. The address of a sector RS in a groove (which is shown as a depressed portion in FIG. 2) G is added in a front part FP of the identification signal area IDF which is immediately before the data recording area DRF in the sector RS in the groove G, being shifted radially outwards by half a groove width from the center of the groove G. The address of a sector RS in a land (which is shown as a projecting portion in FIG. 2) L is added in a rear part RP of the identification signal area IDF immediately before the data recording area DRF in a groove track G adjacent and radially outward of the sector RS in the land L, being shifted radially inwards by half a groove width from the center of the groove. As a result, the address of a land sector is added or provided in the rear part RP of the identification signal area IDF in a groove immediately before the data recording area DRF of the land sector, being shifted radially outwards by half a groove width from the center of the land L. In this way, the address of a land sector is added to a groove rather than to a land, and an identification signal area in a land contains no identification signal.

The sector identification data of the identification signal area IDF also has or contains information on a tracking polarity for each of groove sectors and land sectors as well as the sector address.

This scheme is used because a tracking offset occurring during the cutting of a master original in a mastering process will be smaller if the addresses of both lands and grooves are cut simultaneously during the cutting of groove tracks. If cutting the groove sector addresses during cutting of the groove recording track, and cutting the land sector addresses during cutting of the land recording track (tracing land track with the laser beam turned off) will result in a smaller tracking offset because of the tracking offset characteristics, cutting of the groove sector addresses and the land sector addresses may be performed separately.

The reason why the identification signals are shifted by half a groove width from the center of the track is to ensure that the identification data of substantially the same quality can be obtained regardless of whether a track being scanned is a groove track or a land track as the identification data is shared by a groove track and a land track. When the width of a groove is not identical to a track pitch, the amount of the shift may be set to half a track pitch.

Figure 3:
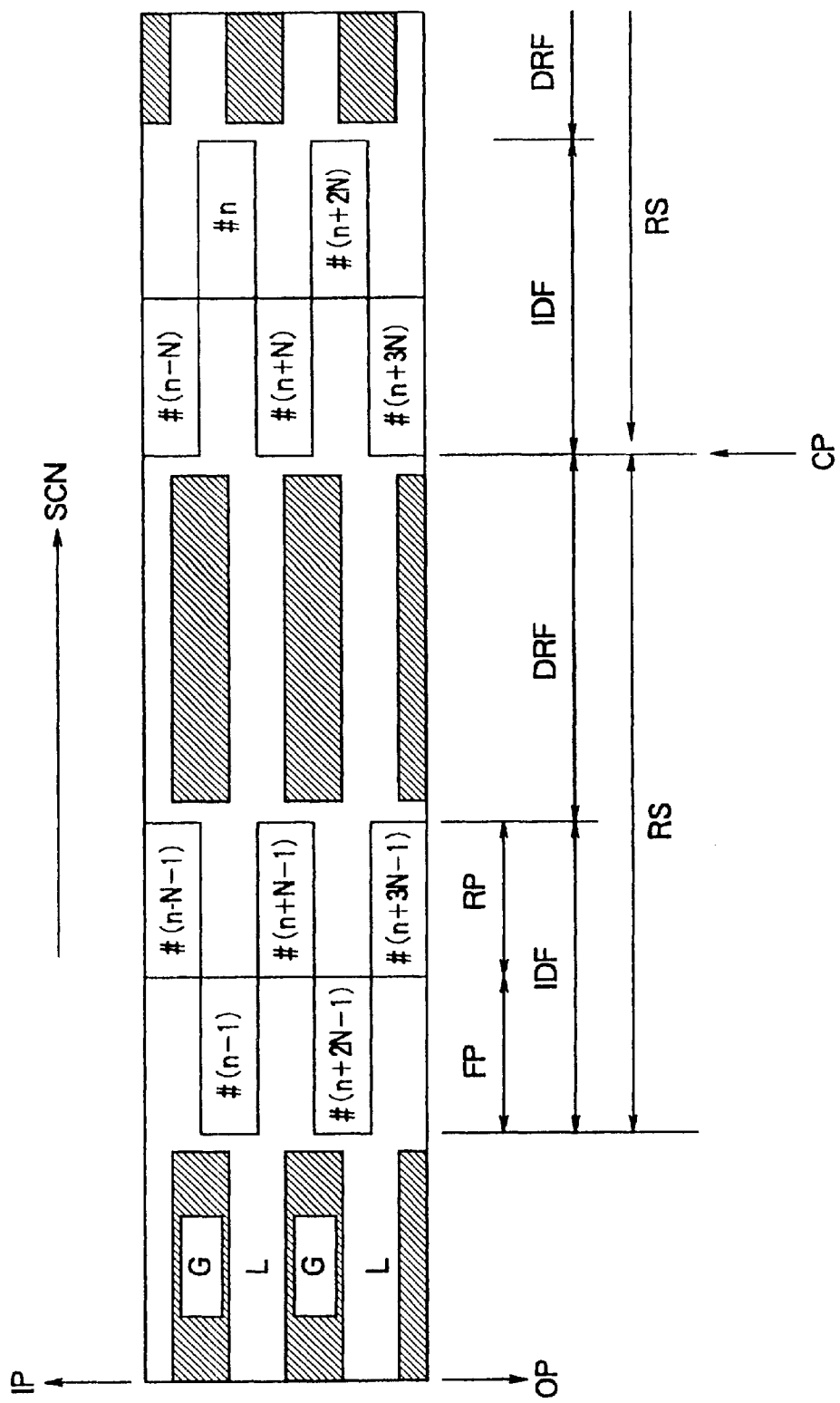
FIG. 3 is a drawing schematically showing the arrangement of identification signals within data recording sectors around a boundary between a land and a groove and their addresses on an optical disk medium according to the first embodiment of the present invention.

Next, description is directed to prepits in identification signal areas around connecting points between lands and grooves, which are present at every revolution of a disk and aligned in a radial direction of the disk, and a method of assigning addresses to such identification signal areas. FIG. 3 schematically shows the arrangement of identification signal prepits within recording sectors around boundaries between grooves and lands on an optical disk according to the first embodiment of the present invention, and their address values. n (which is an integer) represents the address of the recording sector, and N (which is also an integer) represents the number of sectors per track. In an SS-L/G format optical disk, there is a connecting point CP at which a groove track G and a land track L are connected at every revolution of the disk and the boundaries or connecting points CP at every revolution are arranged in a radial direction. The arrangement of the identification signal areas in a recording sector RS immediately after a connecting point CP is similar to that in other recording sectors (recording sectors RS which are not at a connecting point CP) in that the front part FP of the identification signal area IDF is shifted by half a groove width radially outwards from a groove G, and the rear part RP of the identification signal area IDF is shifted by half a groove pitch radially inwards from the groove G. The assignment of address values is also similar to the parts other than connecting points. That is, the address of a groove sector is assigned to the front parts FP of the identification signal area IDF, which is shifted radially outwards by half a groove width from a groove G immediately before the data recording area DRF of the groove sector. The address of a land sector is assigned to the rear part RP of the identification signal area IDF, which is shifted radially outwards by half a groove width from a land L immediately before the data recording area DRF of the land sector.

To detect a connecting point CP between a groove recording track G and a land recording track L, determination is made as to which radial direction the front part FP and the rear part RP of an identification signal area IDF are shifted with respect to the center of a track in a state in which tracking is achieved. The address of a groove sector can be identified as an identification signal in the front part FP which is shifted radially outwards by half a track pitch from the groove, and the address of a land sector can be identified as an identification signal in the rear part RP which is shifted radially outwards by half a track pitch from the land. In either case, the part of identification signal area which is shifted radially outwards represents the address of the sector, while the part of the identification signal area shifted radially inwards represents the address of a sector adjacent thereto and positioned radially inwards.

Now, description is directed to detection of a track connecting point CP during a seek operation. At the time of passage of a zone boundary, the occurrence cycle of a preformatted identification signal changes stepwise, and sector synchronization tends to be lost. With an SS-L/G recording format, it is necessary to detect a land/groove switching point CP accurately even in such a circumstance.

In the ZCLV method, at the time of seeking into a different zone, the identification signal is not detected at a predetermined time interval until the rotational speed of the disk has been settled to a value specified for the zone, and sector synchronization is thus lost. In the case of an ordinary land/groove recording recording disk, it was possible to pull into tracking stably whichever of a land track or a groove track the tracking may be applied. In the case of an SS-L/G recording disk, tracking may fail if a land/groove switching point CP appears immediately after the tracking pull-in. The probability of occurrence of failure of the tracking pull-in is low, and recovery can be achieved by re-trying. However, in order to improve the speed and the reliability of the access, it is desirable to achieve a correct tracking pull-in without fail.

In the method of inserting an identification signal for an SS-L/G recording disk described in the first embodiment, the polarity can be determined reliably by the order of directions of shifting of the identification signals as described above. Thus, it is possible to avoid the failure of a tracking pull-in which tended to occur with the conventional SS-L/G recording disk.

As one of the additional functions and effects, track offset compensation is described. As has been used in the optical disk standard ISO/IEC 9171-1, 2 "130 mm Optical Disk Cartridge Write Once for Information Interchange", 1990 and the like, for an optical disk which uses a sample servo method, a method is known in which the amount of tracking offset is detected using a pair of pits formed on a recording track, being shifted in opposite directions by a predetermined distance from the center of the track, and the correction of the tracking offset is applied accordingly.

When a light beam passes through the midpoint of the pair of pits, the amplitudes of reproduced signals from the detection pits will be equivalent. If the light beam is deviated from the center of the track in one direction, the amplitude of the reproduced signal from one of the track offset detection pits will increase, and the amplitude of the reproduced signal from the other one of the track offset detection pits will decrease. On the basis of the reproduced signals, it is possible to detect the amount of track offset of the light beam, and apply correction, so that the light beam is controlled to follow the center of the track. According to the present invention, the same principle can be applied to a single spiral land/groove recording format optical disk.

Let us assume that a light beam has passed through the data recording area (field) in a particular groove recording sector and has entered the identification signal area of the subsequent groove sector. Because the front part FP of the identification signal area IDF is shifted radially outwards by half a track pitch, a corresponding tracking error signal is produced. Subsequently, there appears a rear part RP of the identification signal area IDF which is shifted radially inwards by half a track pitch, so a corresponding tracking error signal is produced. If these two tracking error signals are of the same magnitude and of opposite polarities, it means that the light beam is scanning the center of the track. The magnitudes of the two tracking error signals are different if the light beam is deviated from the midpoint of the pair of the identification signal areas, and the difference between them and the polarity of the difference depend on the amount and direction of deviation of the light beam from the center of the midpoint. Thus, by comparing the magnitudes of the tracking error signals detected from the front part and the rear parts of the identification signal area which are shifted radially outwards and inwards, a tracking servo can be controlled in such a manner that the light beam will scan the center of the track.

As described above, according to the method of the present invention of inserting identification signals for an SS-L/G recording disk, a servo characteristic can also be improved.

As a further additional function and effect, immunity to defects on the medium is described. Compared with the method of inserting identification signals shown in FIG. 17B, this invention uses a waveform of a differential signal which maintains a high signal level for a predetermined period and then a low signal level for a predetermined period, such a waveform appearing very rarely in the other parts of the disk including data recording areas DRF, for representing a connecting point CP between a land track L and a groove track G, and an identification signal for a sector, with the result that erroneous detection of the identification signal or the connecting point, due to confusion with a signal level change because of a defect on the medium or deterioration in the recording layer, hardly happens.

Figure 17A:
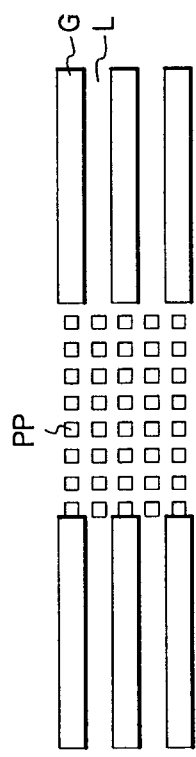
FIG. 17A to FIG. 17C are diagrams showing layout of identification signals in accordance with a conventional land/groove recording method.
Figure 17B:
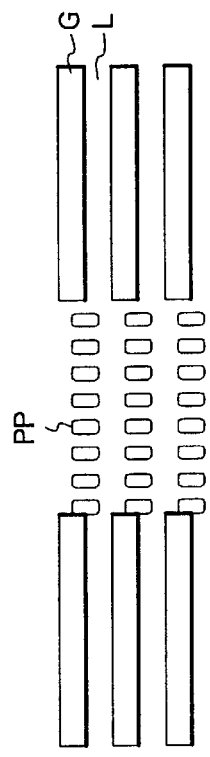
Figure 17C:
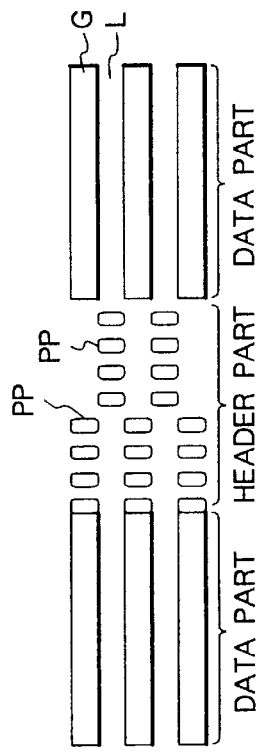

On the other hand, in the method shown in FIG. 17B, a variation in a differential signal, which is similar to that in an identification signal, will occur only if there is a single defect and the like on the disk. Thus, erroneous recognition of a tracking polarity or an identification signal can occur. In terms of the immunity to a defect on the medium as well, this invention is advantageous over the prior art.

It is also possible to use another method of discriminating the polarity. In addition to the address of a sector, an identification signal in the sector contains polarity information indicating whether the sector being accessed is a land sector or a groove sector, or information indicating the position relative to the connecting point. When tracking is achieved correctly, identification data can be read reliably, and the polarity can therefore be set according to this data.

By using the method of discriminating the polarity by means of the directions of the shifting and their order, together with the polarity information in the identification signal, more accurate and reliable tracking polarity setting can be realized. Discriminating the polarity by means of only the polarity information is also possible for simple implementation.

As described above, the first part (FP) of an identification signal area is shifted by a predetermined distance in one radial direction, for example, radially outwards from the center of a groove G, and the second part (RP) of the identification signal area is shifted by the same distance in the other radial direction, for example, radially inwards from the center of the groove G, and when data on this disk is reproduced, a tracking error signal which is obtained as a difference between the outputs of the light receiving parts of the tracking sensor positioned to correspond to the radially different positions on the disk is binarized by two comparators having different threshold values, and changes in the tracking error signal are observed. In this way, the tracking polarity for each recording sector RS can be discriminated, and a connecting point CP between a land track L and a groove track G can be detected reliably.

Second Embodiment

Figure 4:
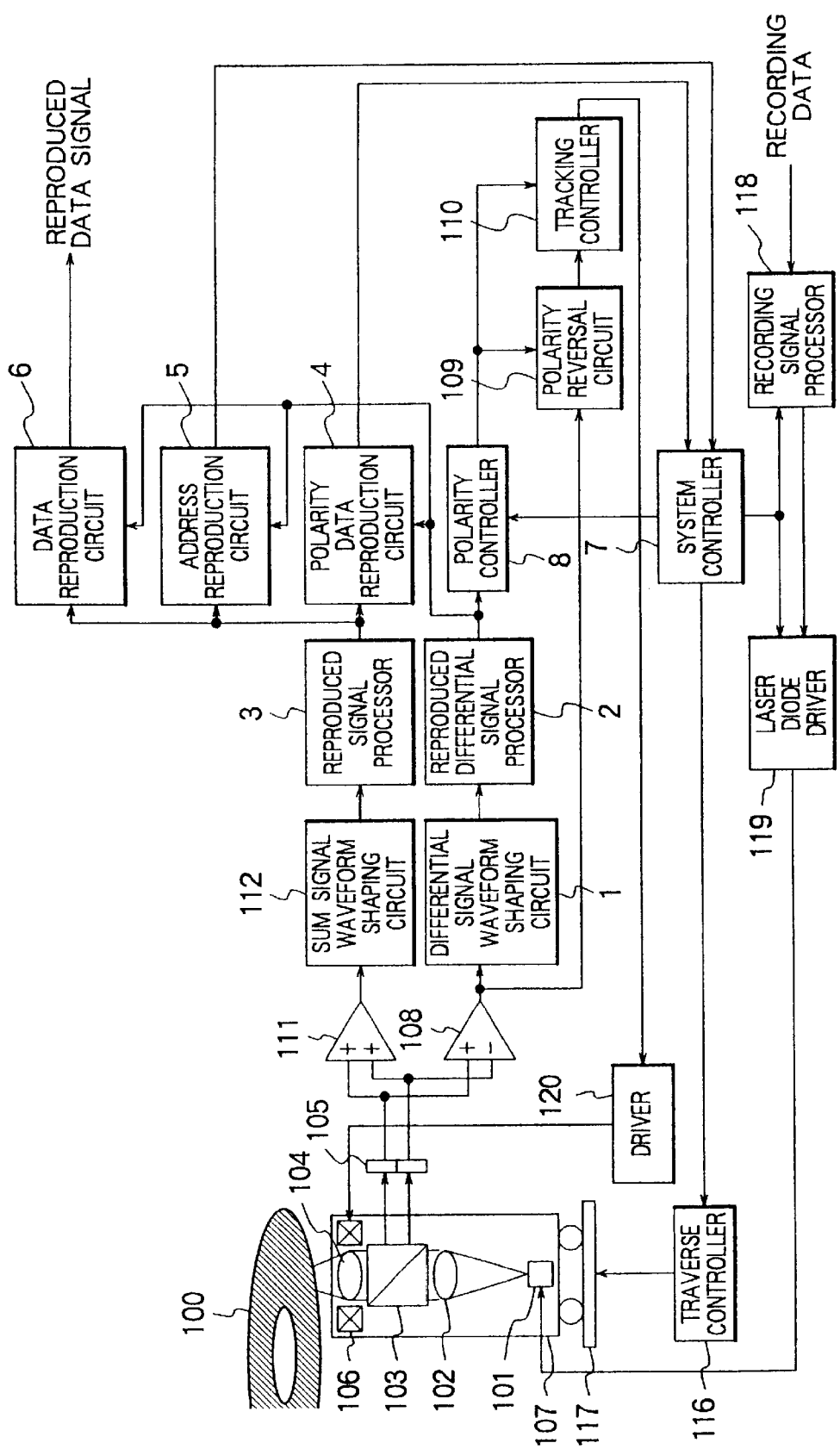
FIG. 4 is a block diagram showing the configuration of an optical disk drive apparatus according to the second embodiment of the present invention.

This embodiment relates to an apparatus for recording and reproducing data on the optical disk medium described in the first embodiment. FIG. 4 is a block diagram showing the configuration of an optical disk drive apparatus according to second embodiment of the present invention. Referring to FIG. 4, reference numeral 100 indicates an optical disk, reference numeral 101 indicates a semiconductor laser, 102 indicates a collimator lens, 103 indicates a half mirror, 104 indicates an objective lens, 105 indicates a photodetector, 106 indicates an actuator, 107 indicates an optical head, 108 indicates a differential signal detector, 109 indicates a polarity reversal circuit, 110 indicates a tracking controller, 111 indicates a summing amplifier, 112 indicates a sum signal waveform shaping circuit, 116 indicates a traverse controller, 117 indicates a traverse motor, 118 indicates a recording signal processor, 119 indicates a laser diode (LD) driver, and reference numeral 120 indicates a driver. These structural elements are basically identical to those of the optical disk drive apparatus illustrated in FIG. 18. Thus, like reference numerals are assigned to these structural elements and description thereof is omitted.

Figure 18:
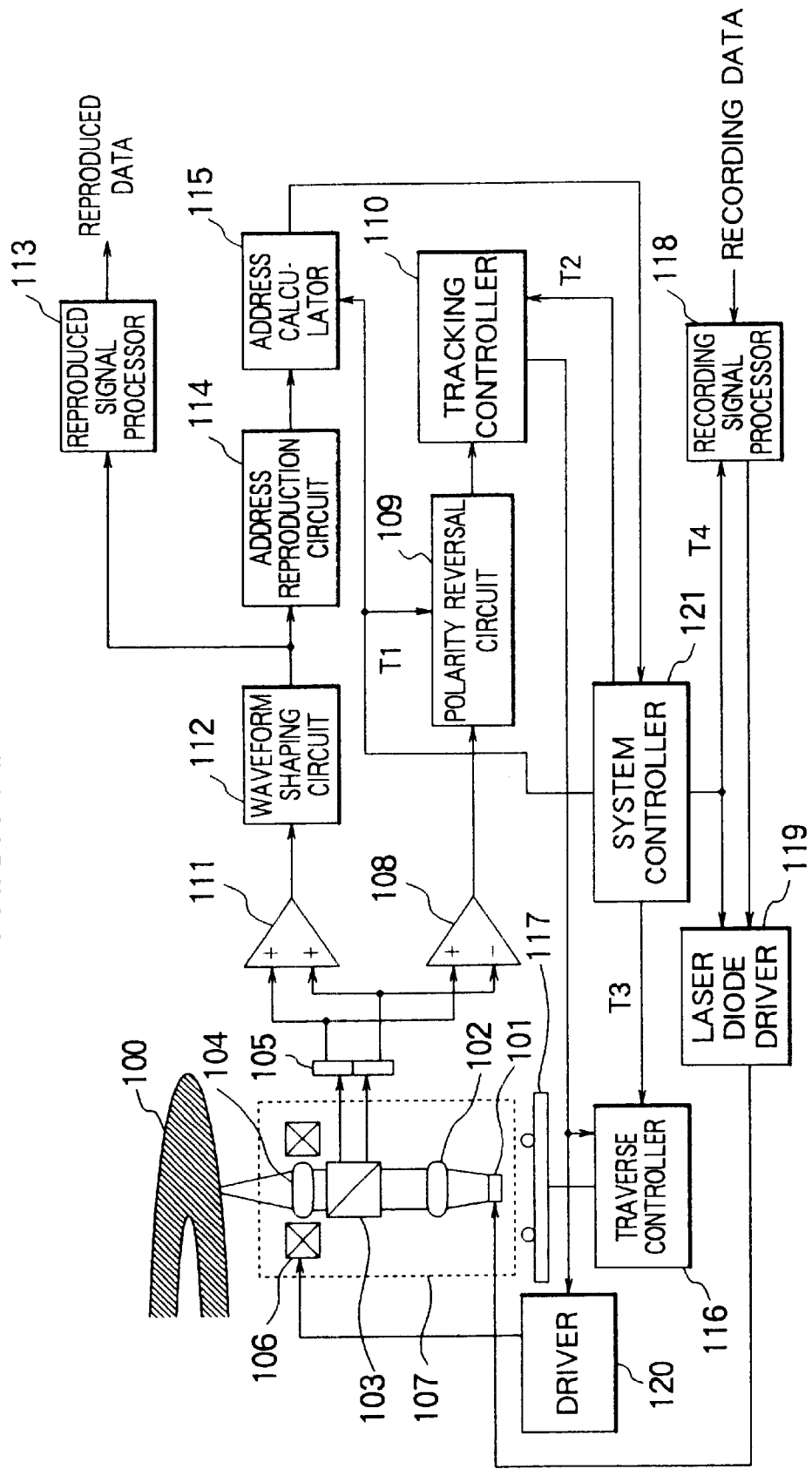
FIG. 18 is a block diagram showing the configuration of a conventional optical disk drive apparatus.

The structural elements which are different from those illustrated in FIG. 18 are described. Reference numeral 1 indicates a differential signal waveform shaping circuit for binarizing the tracking error signal in analog waveform from the differential signal detector 108 in accordance with an appropriate signal level, and outputting the resultant binarized differential signals. Reference numeral 2 indicates a reproduced differential signal processor for extracting the identification signal from the binarized differential signal to determine the tracking polarity, and for supplying polarity detection signals to the polarity controller 8, a polarity information reproduction circuit 4, an address reproduction circuit 5, and a data reproduction circuit 6. Reference numeral 8 indicates a polarity controller for receiving the polarity detection signal from the reproduced differential signal processor 2 and a control signal from the system controller 7 and for supplying a polarity setting signal to the polarity reversal circuit 109 and a control hold signal to the tracking controller 110.

Reference numeral 3 indicates the reproduced signal processor for reproducing an identification signal containing address data and polarity information from binarized sum signals obtained by applying waveform processing to the sum signal. Reference numeral 4 indicates the polarity information reproduction circuit for extracting polarity information indicating the tracking polarity of a sector, from the identification signal. Reference numeral 5 indicates the address reproduction circuit for reproducing sector address data from the identification signal. Reference numeral 6 indicates the data reproduction circuit for reproducing user data recorded in data recording areas on the disk. The reproduced polarity information and the address data are supplied to the system controller 7 and used for control over the sample-hold state in the tracking control, and the tracking polarity.

Reference numeral 7 indicates the system controller for receiving data on the identification signal from the reproduced differential signal processor 2, the polarity information reproduction circuit 4, and the address reproduction circuit 5, and for supplying control signals to the polarity controller 8, the traverse controller 116, the LD driver, and the recording signal processor 118.

The operation before and after a connecting point between a groove track and a land track of an optical disk is described.

Figure 5:
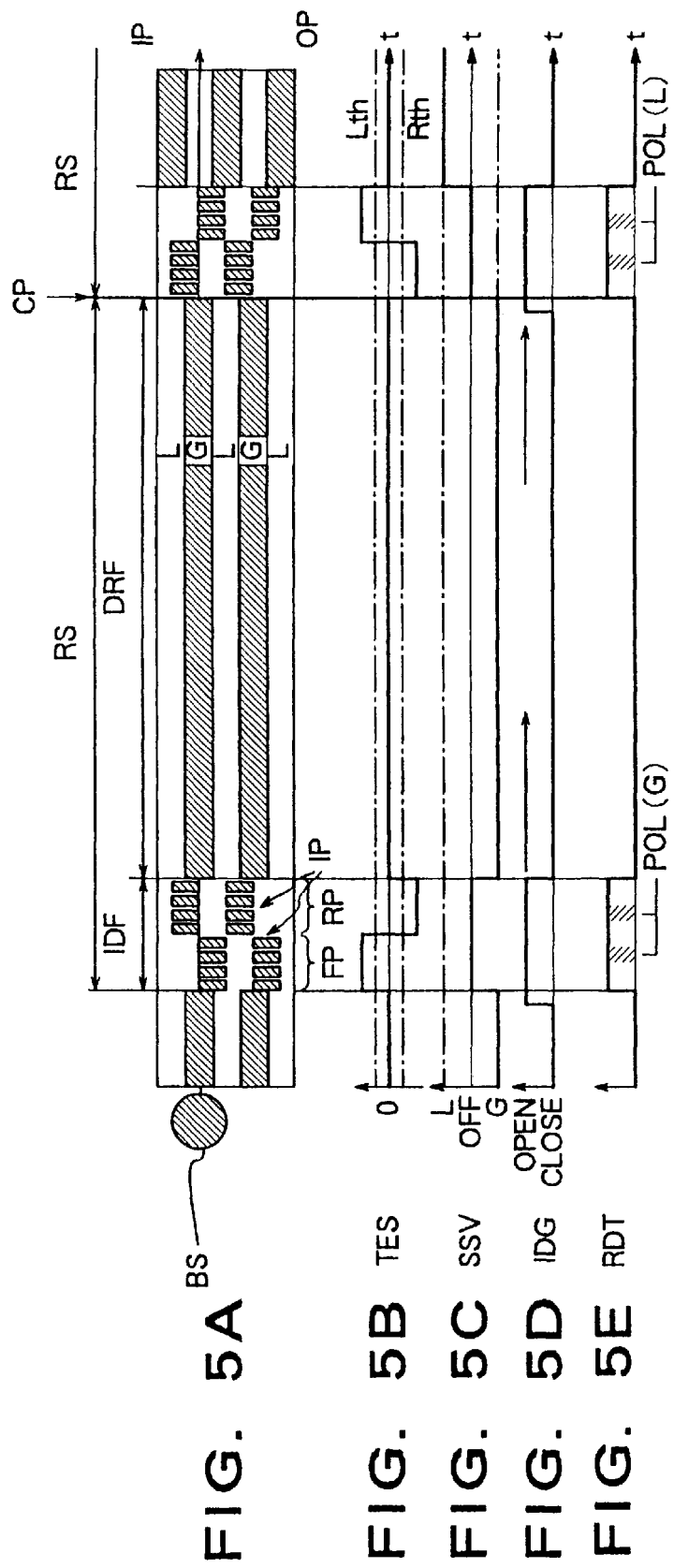
FIG. 5A to FIG. 5E are timing charts for explaining a method of identifying a tracking polarity of a data recording sector according to the second embodiment of the present invention.

FIG. 5A to FIG. 5E show the procedure and the method for applying tracking to an SS-L/G format disk illustrated in FIG. 2 and FIG. 3. FIG. 5A shows the arrangement of grooves G and preformatted identification signals ID. The front part FP of an identification signal area IDF in a groove G is shifted by substantially half a track pitch radially outwards with respect to the center of a groove G, and the rear part RP is shifted by substantially half a track pitch radially inwards with respect to the center of the groove G. Thus, for the light spot scanning along a spiral, the order of the directions of the shifting of the identification signals ID is reversed at a connecting point CP. That is, when the light spot is scanning a groove track G for example, the direction of the shifting of the identification signals ID is radially outwards first, and then radially inwards. When the light spot crosses a connecting point CP, and begins to scan a land track L, the direction of the shifting of the identification signals ID is radially inwards first, and then radially outwards, as will be seen from FIG. 5A.

FIG. 5A through FIG. 5E show the operations of a tracking system and an identification signal detection system when a light spot is passing through preformatted identification signal area of a land/groove switching sector and other, ordinary sectors, and a land/groove switching mechanism. FIG. 5A schematically illustrates the arrangement of the identification signal ID and a light beam spot BS on a disk surface. FIG. 5B shows a tracking error signal TES, FIG. 5C shows the state SSV of a tracking servo system control operation, FIG. 5D shows an identification signal detection window signal WIN, and FIG. 5E shows readout data RDT of a preformatted identification signal containing tracking polarity information. POL(G) represents a L/G polarity information indicating a groove, and POL(L) represents a L/G polarity information indicating a land.

For describing the behavior of a tracking error signal TES when a light beam spot BS passes through an identification signal area IDF, a light beam spot BS which is tracking a groove track, for example, is considered. FIG. 5B shows the tracking error signal TES or differential signal of a push-pull tracking sensor obtained when the light beam is tracing a data recording track.

While a light spot is passing through the identification signal area IDF of an ordinary groove sector, the front part FP of the identification signal area IDF is shifted radially outwards, and a tracking error signal TES indicating that the light spot BS is shifted radially inwards by substantially half a track pitch from the center of a groove G, i.e., indicating the maximum shift is obtained. As the rear part RP of the identification signal area IDF is shifted radially inwards, a tracking error signal TES indicating that the light spot BS is shifted radially outwards by substantially half a track pitch from the center of the groove G, i.e., indicating the maximum shift in the opposite direction is obtained.

In this way, from the fact that the tracking error signal TES during reproduction of data in an identification signal area IDF indicates that, in the front part FP of the identification signal area IDF, the tracking is deviated radially inwards, and that in the rear part RP, the tracking is deviated radially outwards, it can be determined that the data recording area DRF in the recording sector RS after this identification signal area IDF is in a groove track G. Such a behavior of a tracking error signal TES in the identification signal area IDF is commonly seen in any groove track sector.

Next, description is directed to a change in a tracking error signal TES at a boundary CP for transition from a groove track G to a land track L. In an identification signal area IDF of a land sector, the front part FP is shifted radially inwards and the rear part RP is shifted radially outwards. Thus, a tracking error signal TES indicating that in the front part FP of the identification signal area IDF, a light spot BS is shifted by substantially half a track pitch radially outwards from the center of a groove G, i.e., half a track pitch radially inwards from the center of a land L, will be produced, and a tracking signal indicating that in the rear part of the identification signal area IDF, a light spot BS is shifted by substantially half a track pitch radially inwards from the center of a groove G will be produced.

As described above, because a tracking error signal TES during the reproduction of data in an identification signal area IDF indicates that in the front part FP of the identification signal area IDF, the tracking is shifted radially outwards and that in the rear part RP the tracking is shifted radially inwards, it can be determined that the data recording area DRF of the recording sector RS after this identification signal area IDF is in a land track L. Such a behavior of the tracking error signal TES in an identification signal area IDF is commonly seen in any land track sector.

In an identification signal area IDF at the leading end of each track sector, the polarity change of a tracking error signal (i.e., whether the tracking error signal TES indicates radially inward shift first and then radially outward shift, or radially outward shift first and then radially inward shift) is reversed, with respect to the leading end of each of the track sectors which have been traced up to then. The tracking error signal TES which is obtained in this manner while a light spot BS is passing through an identification signal area IDF is binarized by the converters having threshold values Lth and Rth indicated by chain lines as illustrated in FIG. 5B so as to obtain binarized signals. According to the polarities of the binarized signals corresponding to the front part FP and the rear part RP of the identification signal area IDF, it can be determined whether the sector being traced is in a land track L or a groove track G.

Generally, a tracking servo system is designed to have such a response characteristic that the system will not respond to the short length of an identification signal area IDF. Even if a tracking error signal TES is produced during the tracing of the identification signal area IDF, the light beam BS generally keeps on tracing the side edge of the preformatted pits (or whatever position it has assumed upon entry into the identification signal area). Alternatively, as a practical method, in order to shut off the tracking servo system from undesirable disturbance, the tracking error signal may be sampled immediately before the light spot scans the identification signal area IDF, and held, and the light spot is made to pass the identification signal area IDF by means of inertia with no tracking control exercised. FIG. 5C shows such an operation.

Identification signal data such as sector addresses are read out by applying sector synchronization protection by means of an identification signal detection window signal IDG as shown in FIG. 5D, to the periodically appearing identification signals, and by implementing re-synchronization for each sector. By inserting data (POL) on a land/groove tracking polarity into an identification signal, land/groove switching can be performed reliably. In addition, by utilizing an identification signal detection window signal IDG for the sector synchronization protection to gate a tracking error signal TES and discriminating the error polarity as described above, a land/groove switching point CP which occurs once a revolution of the disk can be detected easily, and reliability of tracking polarity switching and tracking polarity setting in SS-L/G recording can be improved.

Now, description is directed to the signal processing procedure for implementing the method of detecting a land/groove track connecting point CP described above, by means of the circuit blocks in an optical disk drive apparatus relating to tracking and identification signal detection.

Figure 6:
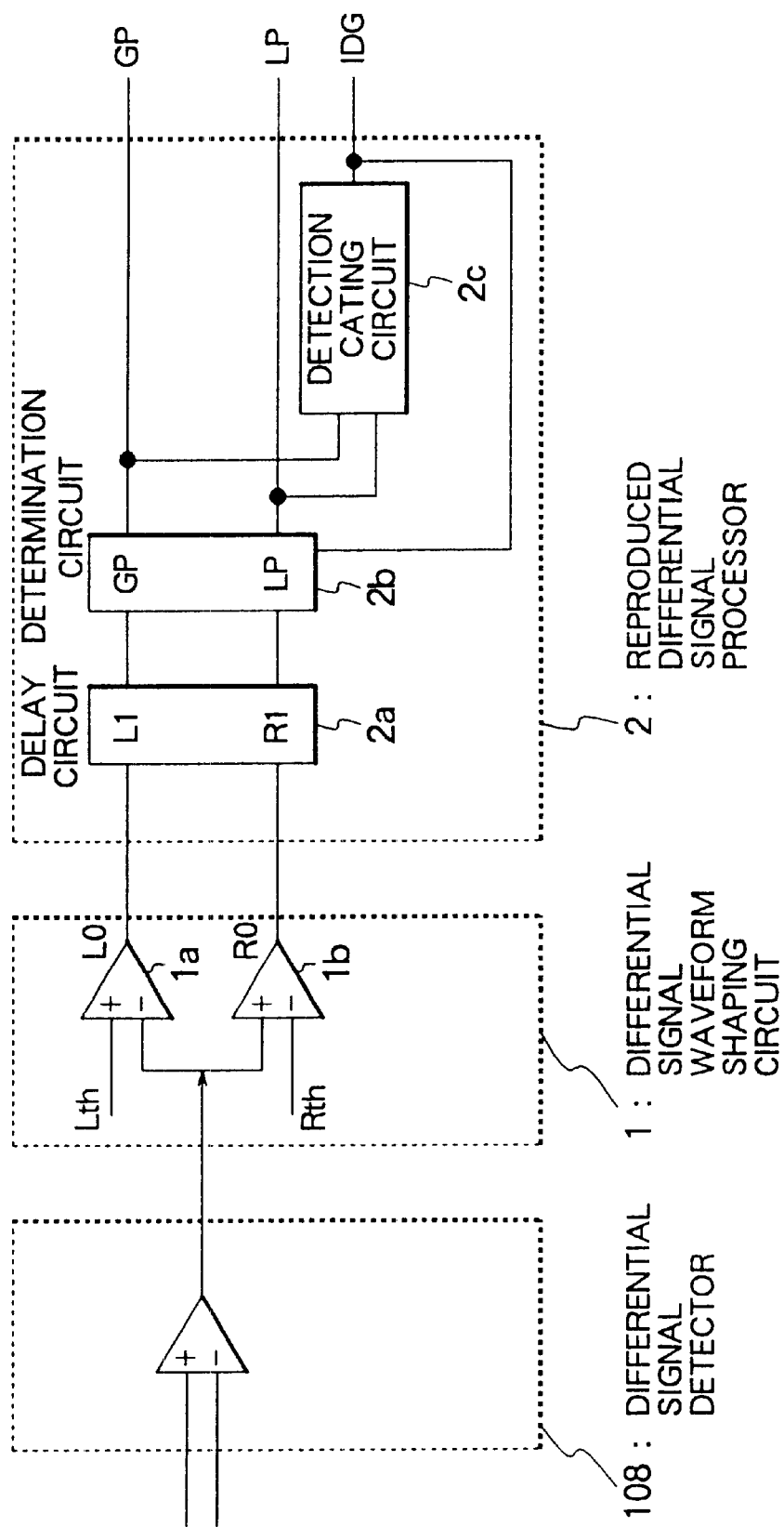
FIG. 6 is a circuit block diagram showing a reproduced differential signal processor of the optical disk drive apparatus according to the second embodiment of the present invention.

FIG. 6 shows block configuration of the differential signal detector 108, the differential signal waveform shaping circuit 1, and the reproduced differential signal processor 2. FIG. 7A to FIG. 7I show changes of signals while a recording track is being tracked. FIG. 7A shows the arrangement of the identification signals on the disk surface. A differential amplifier constituting the differential signal detector 108 determines a difference between two output signals from the two-split photodetector 105, and outputs the difference as a differential signal DFS to be used for the push-pull tracking servo system.

The differential signal DFS is binarized by the differential signal waveform shaping circuit 1. In order to detect that prepits in an identification signal area IDF are shifted by half a track pitch rightwards and leftwards with respect to the light beam scanning direction, two comparators 1a and 1b having a threshold value Lth and a threshold value Rth are provided, and a binarized L0 signal indicating a leftward (radially inward) shift of the light beam tracking, with respect to the tracing direction, and a binarized R0 signal indicating a rightward (radially outward) shift, as shown in FIG. 7C and FIG. 7D are generated. If the level of the differential signal DFS is not less than Lth, the L0 signal is made High. If the level of the differential signal DFS is not more than Lth, the L0 signal is made Low. If the level of the differential signal DFS is not more than Rth, the R0 signal is made High. If the level of the differential signal DFS is not less than the Rth level, the R0 signal is made Low. FIG. 7C and FIG. 7D show the L0 and R0 signals, respectively. The values of Lth and Rth are set, for example, to the level of the differential signal DFS produced when the tracking deviation is equivalent to a quarter of a track pitch. If the set values are too small, erroneous detection of a land/groove track connecting point CP may occur when a tracking deviates due to the disturbance. If the set values are too great, shift of an identification signal could be overlooked due to a variation in the reflective index caused by dust or the like on the disk. For this reason, the threshold values, for example, may be set to an appropriate values between them. It may be at the center of the amplitude of an identification signal, as shown in FIG. 7B.

The binarized differential signals are digitized by the reproduced signal processor 2, which outputs a polarity discrimination signal (GP, LP) indicating whether the sector being traced is a land sector or a groove sector. The reproduced signal processor 2 also generates a detection gating signal IDG for estimating an occurrence interval of an identification signal. As shown in FIG. 6, the reproduced differential signal processor 2 comprises a delay circuit 2a, a determination circuit 2b, and a detection gating circuit 2c.

Because an identification signal is represented by a prepit sequence formed of intermittent grooves modulated by the data, the two binarized differential signals L0 and R0 are also modulated by the data signal. The delay circuit 2a monitors each of the two input binarized differential signals L0 and R0, and determines whether the pulse train which is obtained by reproducing the prepit sequence continues for at least a predetermined period of t1. Then, as shown in FIG. 7E and FIG. 7F, when the pulse train has continued for at least the predetermined period t1, the delay circuit 2a supplies an L detection signal L1 and an R detection signal R1. The signals L1 and R1 have a pulse width of t3 so that these signals are High for at least until the light spot has passed through the identification signal area. The pulse width t1 should be set to be as long as possible so as to be discriminated from noises such as the one caused by a defect on the medium and the like. The pulse width t1, however, should be shorter than the length of an identification signal area, allowing for a certain margin taking account of the variation in the linear velocity of the optical disk.

With regard to an identification signal for a groove sector, a pulse train of the L0 signal continues for at least the period t1 first, and then a pulse train of the R0 signal continues for at least the period t1. Let us assume now that the front part FP and the rear part RP of an identification signal area IDF are recognized correctly. Then, when the R1 signal rises from Low to High, the L1 signal is High. When the L1 signal rises from Low to High, the R1 signal is still Low.

The L1 signal is latched at the rising edge of the R1 signal to generate a GP signal as shown in FIG. 7G, and the R1 signal is latched at the rising edge of the L1 signal to generate an LP signal as shown in FIG. 7H. With regard to an identification signal for a groove sector, when both of the front part FP and the rear part RP of an identification signal area IDF are recognized correctly, the GP signal is High, while the LP signal is Low.

On the other hand, with regard to an identification signal for a land sector, a pulse train of the R0 signal continues for at least the period t1 first, and then a pulse train of the L0 signal continues for at least the period t1. Thus, 1f the front part FP and the rear part RP of an identification signal area IDF are recognized correctly, when the L1 signal rises from Low to High, the R1 signal is already High, and when the R1 signal rises from Low to High, the L1 signal is still Low. Therefore, with regard to an identification signal for a land sector, when both of the front part FP and the rear part RP of an identification signal area IDF are recognized, the LP signal is High, while the GP signal is Low. Thus, LP signal represents a land polarity detection signal LP which is High when the sector being traced is a land sector, while the GP signal represents a groove polarity detection signal which is High when the sector being traced is a groove sector. Either of these tracking polarity detection signals is High depending on an identification signal for each data recording sector.

Upon expiration of a period corresponding to the data recording part DRF of the sector RS after either of the LP signal and the GP signal rises, an identification signal for a subsequent sector is reproduced. The two tracking polarity detection signals LP and GP are reset to Low, immediately before the identification signal for the subsequent sector. This reset process is carried out at a rising edge of an identification area detection gating signal denoted by IDG in FIG. 7I. The IDG signal is for estimating the time after detection of the identification signal in one sector to an identification signal in a subsequent sector. It is reset to Low when the polarity detection signal GP or LP goes High, and goes High immediately before the occurrence of the identification signal in the next sector, i.e., upon expiration of time t5. During tracking performed with the normal sector synchronization being applied and with identification signals being read, an identification signal appears while the IDG signal is High, so that the IDG signal has a function of an estimation gating signal for removing noises in the differential signal generated while the IDG signal is Low and for extracting identification signals.

In this way, during tracking, on the basis of the differential signal alone, the presence of the identification signals and the direction of shift of the identification signals can be detected, and according to the shift direction and the order of the directions of the shifting of the identification signals, it can be detected whether the sector being traced is a land sector or a groove sector. According to this method, it is possible to determine for each sector whether a connecting point CP between a land track and a groove track is present. Thus, reliable detection of the connecting point can be achieved.

When the synchronization of an identification signal, i.e., the sector synchronization is lost, the identification area detection gating signal IDG is High, so that if identification signals are contained in the binarized signals, timing of the identification signal can be detected, and sector synchronization can be established quickly, as is clear from the above description.

Because an identification signal is detected from a differential signal, a signal having a high level does not appear in the differential signal after a tracking pull-in, except at the part of the identification signals, regardless of whether or not data is recorded in data recording areas. This will be understood from the fact that a tracking error signal is scarcely produced while a tracking servo is applied normally. Thus, there is clearly an advantage that an identification signal is easily detected.

Figures 8A, 8B:
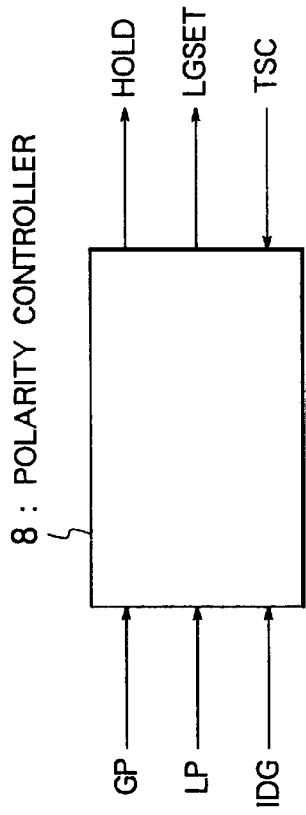
FIG. 8A is a circuit block diagram of a polarity controller.
FIG. 8B is a table showing the function of the polarity controller of the optical drive apparatus according to the second embodiment of the present invention.

The operation of the polarity controller will be described next. FIG. 8A shows the configuration of the polarity controller 8. The polarity controller 8 has a function of receiving the polarity detection signals GP and LP, supplying a polarity setting signal LGSET specifying a tracking polarity to the polarity reversal circuit 109, and supplying a control hold signal HOLD directing the continuation or holding of the control to the tracking controller 110. In connection with the tracking ON/OFF operation included in the control sequence for the apparatus, the polarity controller 8 receives a TS control signal TSC as well from the system controller 7. By the combination of these signals, the tracking controller 110 determines a tracking polarity and the control operation.

FIG. 8A shows a circuit block of the polarity controller 8. FIG. 8B shows the states of the two polarity detection signals GP and LP and the identification area detection gating signal IDG, and an example of tracking polarity setting for each state. When an identification signal is detected correctly and one of the polarity detection signals GP and LP is High, the tracking polarity may be set to that of the polarity detection signals which is High. That is, if the polarity detection signal GP is High, the tracking polarity may be set to be one for a groove. If the polarity detection signal LP is High, the tracking polarity may be set to be one for a land. It is convenient from a viewpoint of apparatus control if a default state is set, and in the example under consideration, the default state is set to be a groove polarity. When the tracking polarity setting signal LGSET is High, a land is tracked. When the tracking polarity setting signal LGSET is Low, a groove is tracked. However, when a light spot is in an identification signal area, the HOLD signal is transmitted to the tracking controller 110 so as to halt the tracking control temporarily.

FIG. 5C shows the three states of this tracking control including land tracking, groove tracking, and a tracking control halt by the three levels of a single signal.

Third Embodiment

Another embodiment of the present invention will be described specifically with reference to the drawings.

Figure 9:
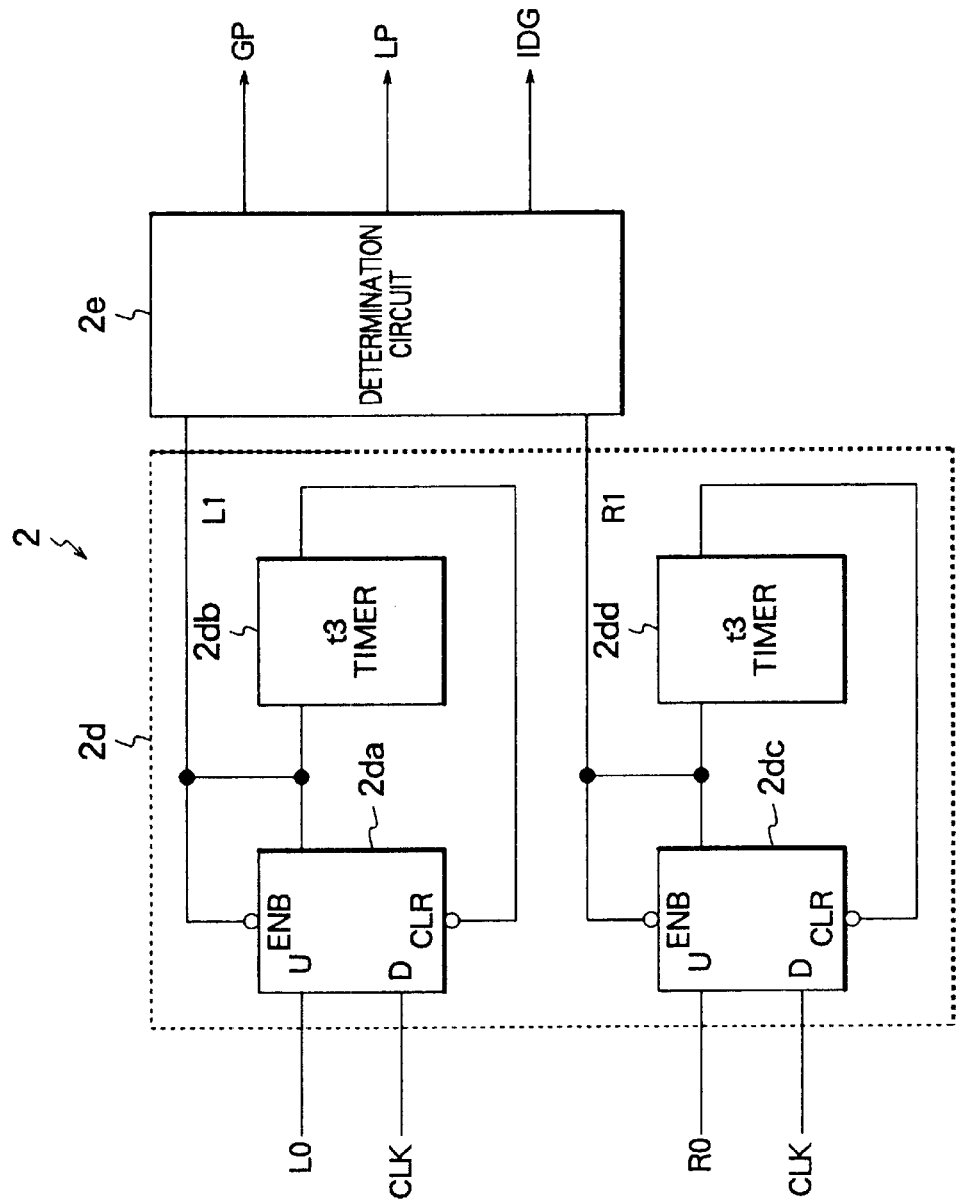
FIG. 9 is a circuit block diagram showing a reproduced differential signal processor of an optical disk drive apparatus according to the third embodiment of the present invention.

FIG. 9 is a block diagram showing another example of configuration of the reproduced differential signal processor 2. The signals while a recording track is being tracked are identical to those illustrated in FIG. 7A to FIG. 7I. The signals of the outputs from the two-split photodetector 105 to the binarized differential signals are identical to those shown in FIG. 6 and FIG. 7A to FIG. 7I. In this embodiment, as shown in FIG. 9, the reproduced differential signal processor 2 comprises two blocks, i.e., a counter circuit 2d and a determination circuit 2e.

Because an identification signal is represented by a sequence of prepits, formed of intermittent grooves due to modulation by data, the two binarized differential signals L0 and R0 from the differential signal waveform shaping circuit 1 also have the waveform of the prepit sequence modulated by the data signal. The counter circuit 2d monitors each of the two input binarized differential signals L0 and R0, and determines whether at least a predetermined number of pulses occur within a predetermined period t2 (t2>t1). When the predetermined number of pulses have occurred, the L detection signal L1 and the R detection signal R1 are produced. The L1 and R1 signals respectively have a pulse width of t3 so that these signals are High at least until the completion of the tracing of the identification signal area IDF. As was described in connection with the second embodiment, the pulse width t1 is set to be as long as possible so as to be discriminated from noise such as that caused by a defect on the medium and the like. The pulse width t1, however, should be shorter than the length of an identification signal area, allowing for a certain margin taking account of the variation in the linear velocity of the optical disk.

Because the identification signal area contains a stipulated number of preformatted data specified in the format, at least a predetermined number of pulses are contained in each of the front part FP and the rear part RP of the identification signal area IDF. An identification signal can be detected on condition that at least a predetermined number of pulses are input within a specified period.

In the reproduced differential signal processor circuit 2 illustrated in FIG. 9, the L0 signal is supplied to the up input U of a first up-down counter 2da, and clock pulses CLK for counting the determination period t2 are input to the down input D, and a clear signal CLR for removing noise pulses is supplied. Specifically, clock signals of a low frequency may be used as the clock pulses CLK for counting the determination period. In the up-down counter 2da, when an identification signal area is traced, the pulses of the L0 signal are counted to a stipulated number and the L1 signal goes High. The L1 signal continues to be High for the period t3. After the elapse of the period t3, the L1 signal is reset by a t3 timer 2db. The t3 timer 2db clears (resets) the up-down counter 2da, the period t3 after the L1 signal goes High.

The R0 signal is supplied to the up input U of a second up-down counter 2dc, and clock pulses CLK for counting the determination period t2 is input to the down input D, and a clear signal CLR for removing noise pulses is supplied. This up-down counter 2dc is cleared by a t3 timer 2dd, and the operations of the up-down counter 2dc and the t3 timer 2dd are identical to those of the up-down counter 2da to which L0 is input and the t3 timer 2db. But R1 signal rather than L1 signal is produced.

In the determination circuit 2e, determination is made based on the L1 and R1 signals to produce the polarity detection signals GP and LP, in the same way as in the second embodiment. The recognition and determination of an identification signal for a groove sector or a land sector can be performed, as in the first embodiment.

Fourth Embodiment

Another embodiment of the present invention will be described specifically with reference to the drawings.

Figure 10:
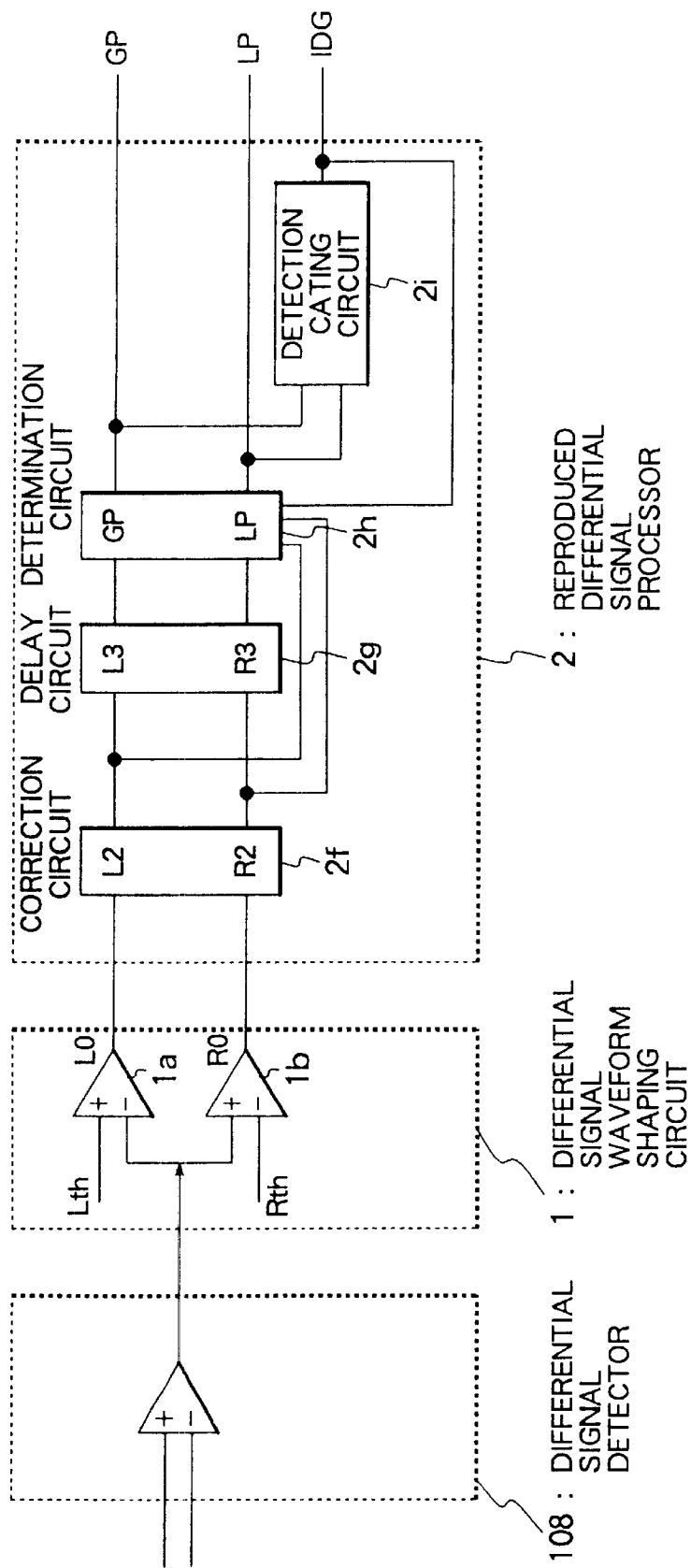
FIG. 10 is a circuit block diagram showing a reproduced differential signal processor of an optical disk drive apparatus according to the fourth embodiment of the present invention.
Figure 11:
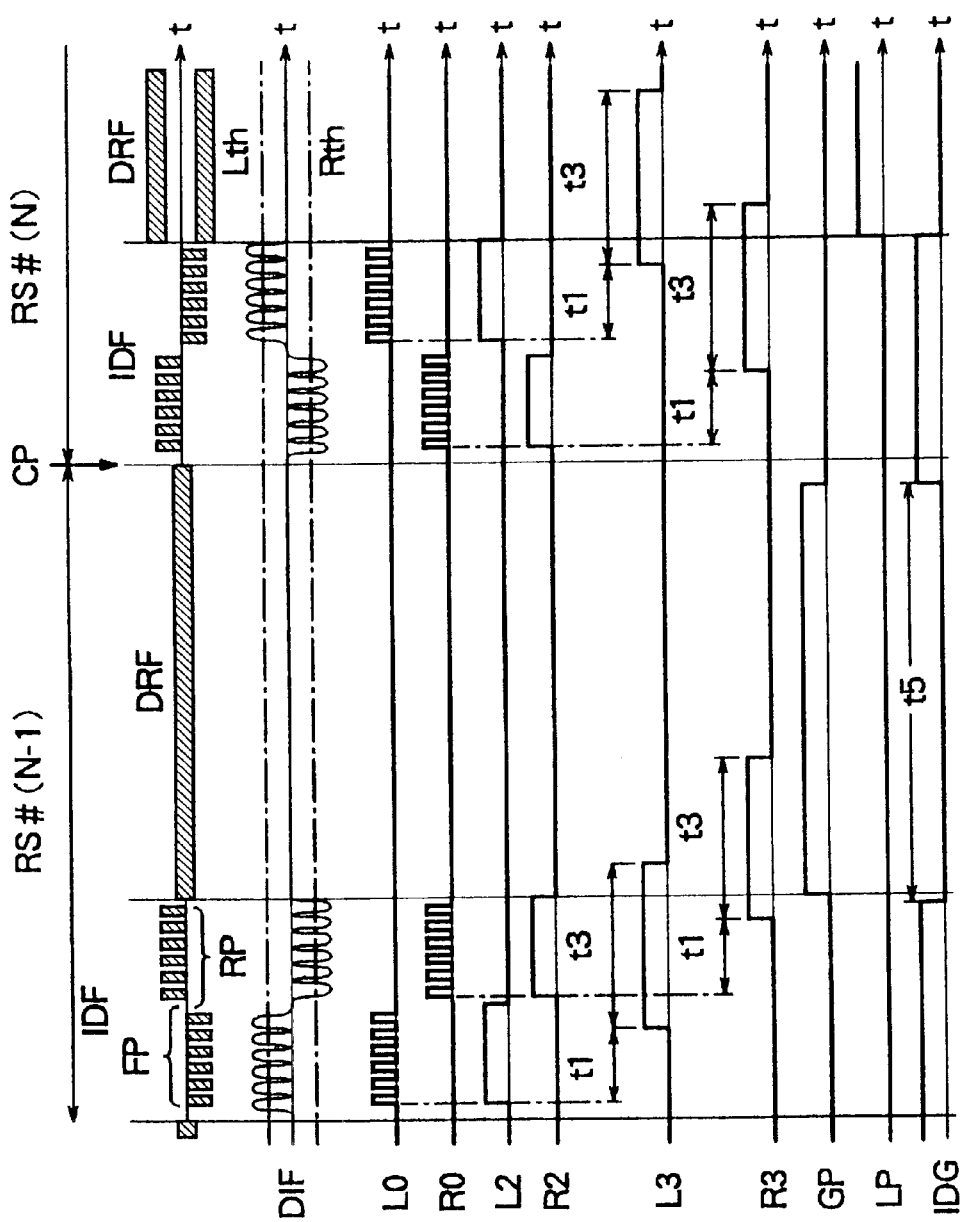
FIG. 11A to FIG. 11K are detailed timing charts for explaining a method of identifying a tracking polarity of a recording sector according to the fourth embodiment of the present invention.

FIG. 10 shows another block configuration of the differential signal detector 108, the differential signal waveform shaping circuit 1, and the reproduced differential signal processor 2. FIG. 11A to FIG. 11K show the signals while a recording track is being tracked. FIG. 11A shows the arrangement of the identification signals on the disk surface. The signals at the outputs of the two-split photodetector 105 to the binarized differential signals are identical to those shown in FIG. 6 and FIG. 7A to FIG. 7I. As shown in FIG. 10, the reproduced differential signal processor 2 comprises four blocks, namely a correction circuit 2f, a delay circuit 2g, a determination circuit 2h, and a detection gating circuit 2i.

Because an identification signal is represented by a sequence of prepits, formed of intermittent grooves due to modulation by data, the two binarized differential signals L0 and R0 from the differential signal waveform shaping circuit 1 also have the waveform of the prepit sequence modulated by the data signal. The correction circuit 2f corrects the pit sequence waveform using a re-triggerable mono-stable multivibrator, for example, so that each of the front part FP and the rear part RP of the identification signal forms a single, continuous pulse, to thereby enable detection of the presence or absence of the front part FP and the rear part RP of the identification signal area IDF, from the two input binarized differential signals. The L0 signal is corrected to generate a binarized corrected differential signal L2, and the R0 signal is corrected to generate a binarized corrected differential signal R2.

The delay circuit 2g monitors each of the two input binarized differential signals L2 and R2, and determines whether a pulse sequence obtained by reproducing the prepit sequence continues for at least a predetermined period t1. If the pulse sequence has continued for at least the predetermined period t1, an L detection signal L3 and an R detection signal R3 are produced. The L3 and R3 signals respectively have a pulse width of t3 so that these signals are High at least until the completion of the tracing of the identification signal area.

The recognition and determination of an identification signal for a groove sector or a land sector can be performed, as in the second embodiment.

Fifth Embodiment

Another embodiment of the present invention will be described specifically with reference to the drawings.

Figure 12:
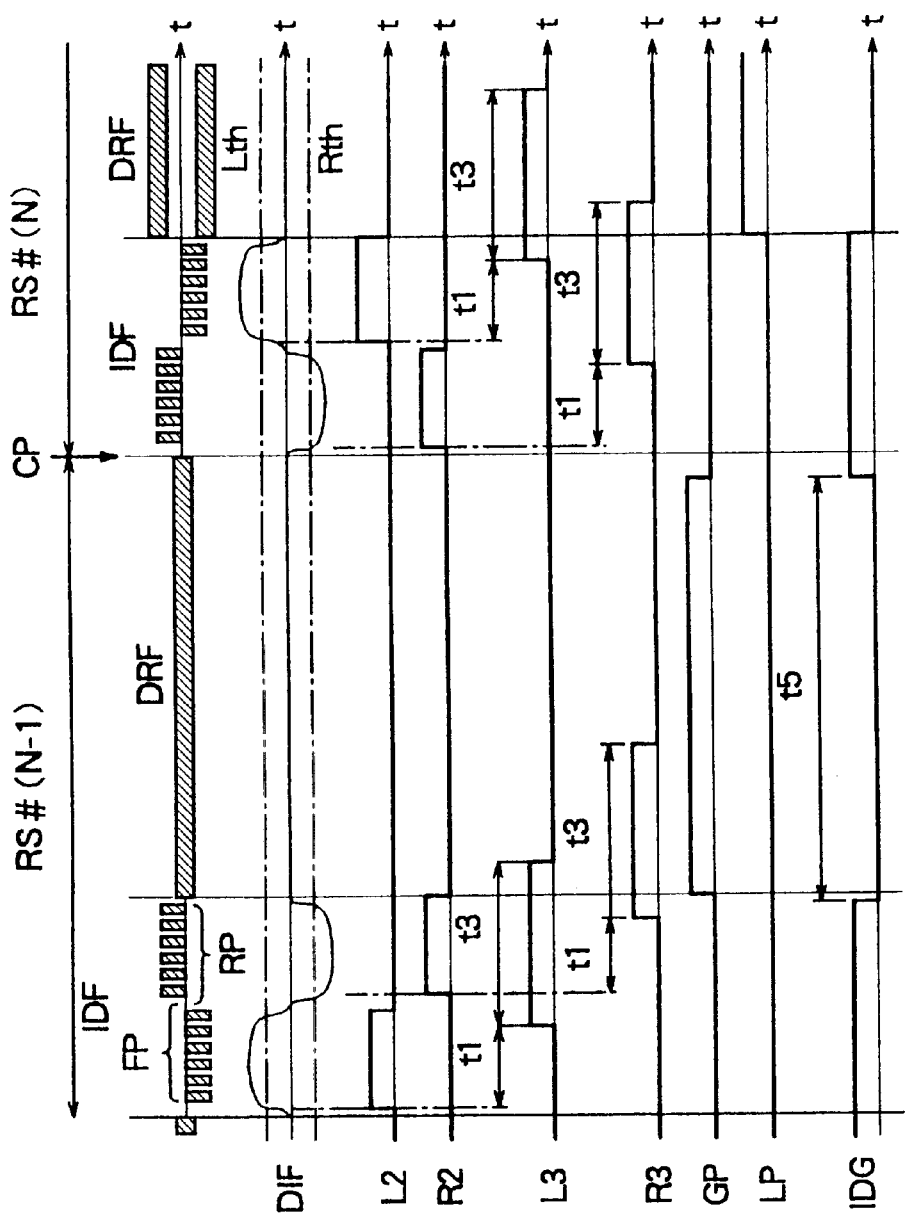
FIG. 12A, FIG. 12B, and FIG. 12E to FIG. 12K are detailed timing charts for explaining a method of identifying a tracking polarity of a recording sector according to the fifth embodiment of the present invention.
Figure 13:
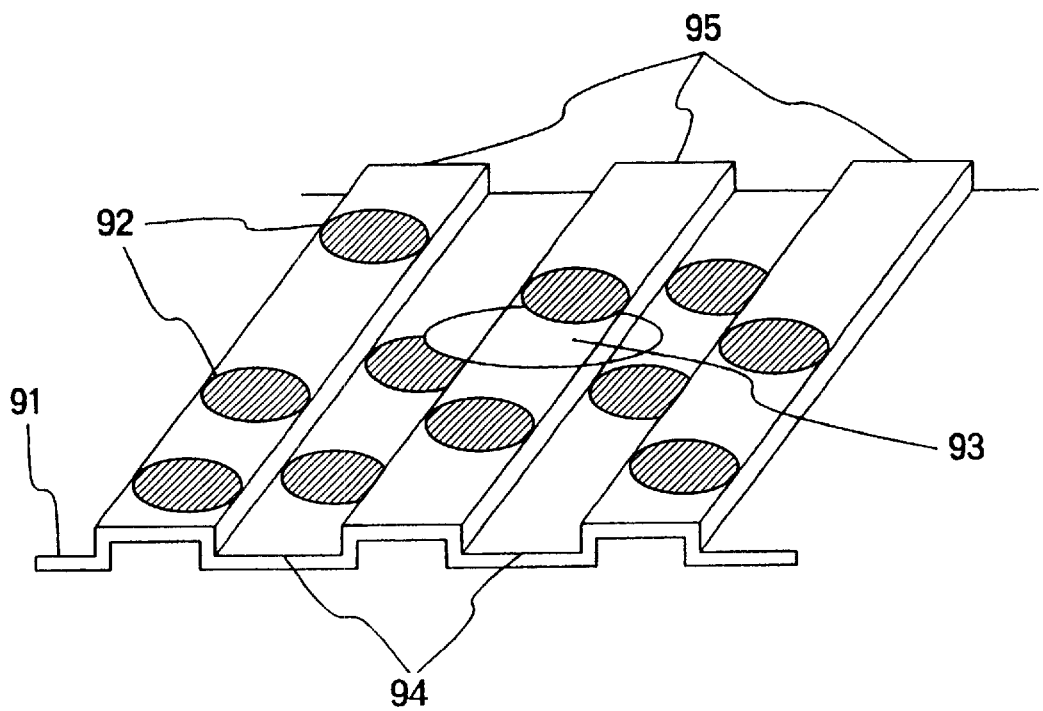
FIG. 13 is a drawing showing an example of conventional land/groove recording optical disk.
Figure 14:
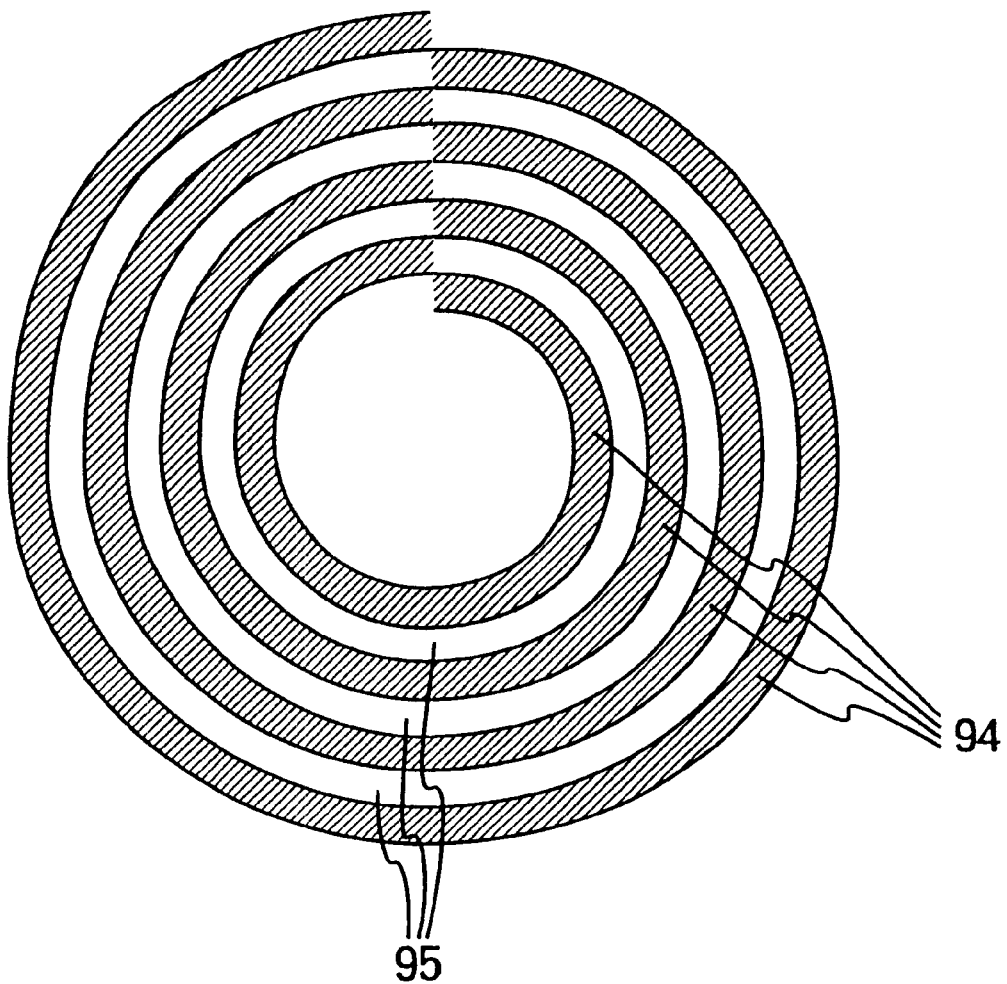
FIG. 14 is a drawing showing an example of conventional optical disk having a single spiral land/groove recording format.
Figure 15:
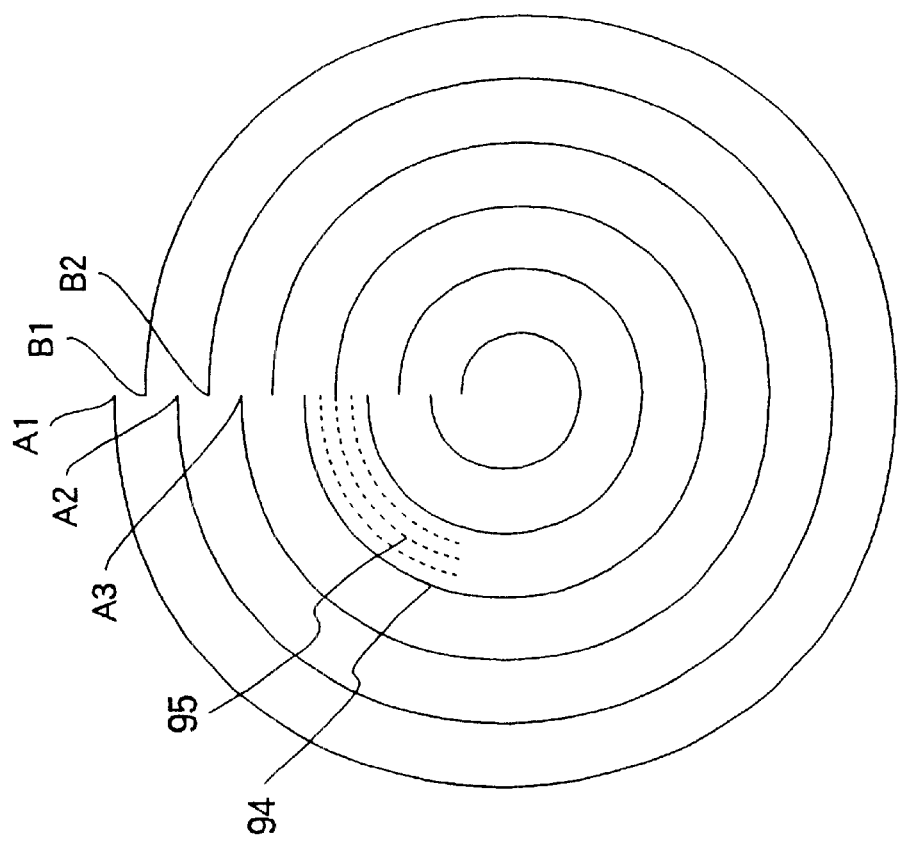
FIG. 15 is a drawing showing an example of land/groove connecting point on a conventional single spiral land/groove recording optical disk.
Figure 16B:
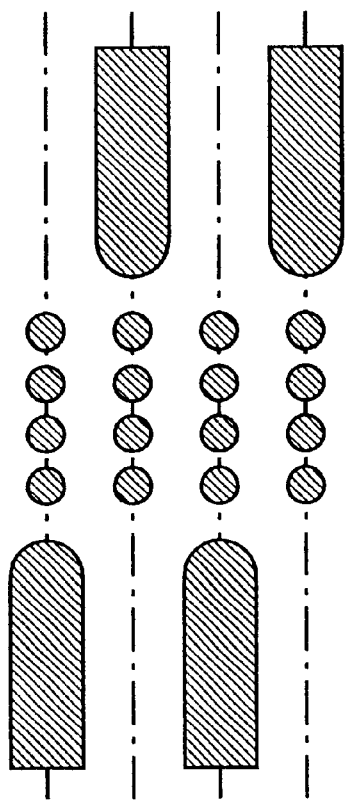
FIG. 16A and FIG. 16B are diagrams showing another example of connecting points on conventional single spiral land/groove recording optical disk.
Figure 16A:
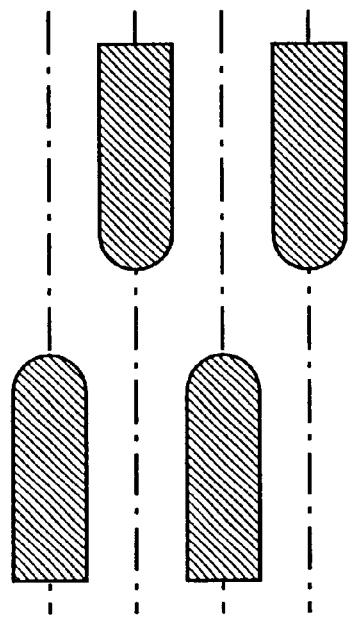

FIG. 12A, FIG. 12B and FIG. 12E to FIG. 12K show an example where the process at the differential signal waveform shaping circuit 1, described in connection with the third embodiment, is simplified by restricting the frequency characteristic of the differential signal detector 108. Generally, the frequency range in which a differential signal DIF within the servo control band can be detected is sufficient for the tracking control system. Thus, an inexpensive amplifier with a narrow bandwidth can be used as a differential input amplifier for detecting a differential signal. An identification signal is in the form of a sequence of pits, formed of intermittent grooves by modulation with data. The differential signal DIF is in a smoothed waveform, because of the low-pass filtering, as shown in FIG. 12B.

The process in the reproduced differential signal processor 2 does not require the correction circuit 2f used in the fourth embodiment, and the two binarized signals can be treated in the same way as L2 and L3 in FIG. 11E and FIG. 11G.

The subsequent process is the same as in the third embodiment.

The same circuit configurations using the specific characteristics of the band-limited filter as is shown in this embodiment can be applied to the second embodiment.

In the second to fifth embodiments described above, description has been given to the operation in which determination is made on the directions of the displacement of the identification signal and the order of the directions from the differential signal which is output from the tracking sensor, and the tracking polarity is determined accordingly. It is also possible to reproduce, at the polarity information reproduction circuit 4, the polarity information in the identification signal from the sum signal which is output from the tracking sensor, and use the result in combination with the result of the tracking polarity determination obtained from the differential signal. By using both of the polarity information and the result of the tracking polarity discrimination obtained from the differential signal, more accurate and reliable tracking polarity setting can be realized.

The methods of detecting an identification signal and a track connecting point described in the above embodiments are, of course, only the examples to illustrate the present invention. Similar functions may be implemented by various circuit configurations, and the present invention is not limited to the above embodiments.

What is claimed is:

1. A method of reproducing data from an optical disk using an optical head which includes a multi-section photodetector, the optical disk having recording sectors of predetermined length and embossed pits for sector identification information, said method comprising:

receiving signals produced by said multi-section photodetector as said optical head scans said embossed pits;

generating a differential signal based on said signals produced by said multi-section photodetector as said optical head scans said embossed pits;

producing a gating signal using a comparison with a gating signal threshold; and removing noise in said differential signal using said gating signal.

2. The method of claim 1, wherein said embossed pits for sector identification are located at a boundary of neighboring tracks.

3. The method of claim 2, wherein said optical disk includes land and groove track revolutions that are connected to form a single spiral of alternating land and groove tracks and said embossed pits are radially offset from a center of a groove track so as to overlap radially adjacent land and groove tracks.

4. The method of claim 1, wherein said comparator circuitry includes first and second comparators that use first and second threshold levels, respectively, to binarize said differential signal.

* * * * *